US012606096B1

(12) United States Patent
Sutliff

(10) Patent No.: US 12,606,096 B1
(45) Date of Patent: Apr. 21, 2026

(54) MOTORCYCLE OR ELECTRIC BIKE RACK FOR A VEHICLE

(71) Applicant: Russell Sutliff, Granite Bay, CA (US)

(72) Inventor: Russell Sutliff, Granite Bay, CA (US)

( * ) Notice: Subject to any disclaimer, the term of this patent is extended or adjusted under 35 U.S.C. 154(b) by 0 days.

(21) Appl. No.: 19/407,133

(22) Filed: Dec. 3, 2025

(51) Int. Cl.
*B60R 9/10* (2006.01)

(52) U.S. Cl.
CPC ..................................... *B60R 9/10* (2013.01)

(58) Field of Classification Search
CPC ......... B60R 9/10; B60R 9/042; B60R 9/0426; B60R 9/06; B60R 9/02
USPC ......................................................... 224/924
See application file for complete search history.

(56) References Cited

U.S. PATENT DOCUMENTS

| | | | | |
|---|---|---|---|---|
| 4,191,316 A | * | 3/1980 | Baumgartner | B60R 9/10 224/532 |
| 5,456,564 A | * | 10/1995 | Bianchini | B60R 9/06 224/508 |
| 6,007,289 A | * | 12/1999 | Kruse | A61G 3/0209 414/921 |
| 6,095,349 A | * | 8/2000 | O'Meara | B60R 9/06 212/293 |
| 10,688,939 B2 | * | 6/2020 | Settelmayer | B60R 9/10 |
| 12,434,951 B2 | * | 10/2025 | Crain | B66D 1/00 |
| 2004/0018074 A1 | * | 1/2004 | Elder | B60P 1/5471 414/462 |
| 2004/0234367 A1 | * | 11/2004 | Pacini | B60R 9/06 414/543 |
| 2013/0181023 A1 | * | 7/2013 | Shawanda | B66D 1/00 224/403 |

FOREIGN PATENT DOCUMENTS

| | | | | |
|---|---|---|---|---|
| DE | 2712776 A | * | 9/1978 | B60R 9/10 |
| DE | 102016005583 A1 | * | 11/2017 | B60R 9/10 |

OTHER PUBLICATIONS

English translation of DE-102016005583-a1 (Year: 2017).*
English translation of DE-2712776-A (Year: 1978).*

* cited by examiner

*Primary Examiner* — Scott T Mcnurlen
(74) *Attorney, Agent, or Firm* — Craig A. Simmermon

(57) ABSTRACT

A motorcycle or electric bike rack for a vehicle with a winch that can securely load, haul, and unload a very heavy motorcycle or a very heavy electric bike onto the vehicle rack without the user having to lift the motorcycle or electric. The motorcycle or electric bike rack for a vehicle has a special double boom assembly that that is connected to a winch with a special multi-axis hinge or joint that allows for rotation, tilting, and collapsing of the double boom assembly while securely holding the motorcycle or electric bike.

2 Claims, 16 Drawing Sheets

MOTORCYCLE OR ELECTRIC BIKE RACK FOR A VEHICLE

BACKGROUND OF THE INVENTION

1. Field of the Invention

This invention relates to a motorcycle or electric bike rack for a vehicle and more specifically to a vehicle rack with a winch that can securely load, haul, and unload a very heavy motorcycle or a very heavy electric bike onto the vehicle rack without the user having to lift anything heavy. The motorcycle or electric bike rack for a vehicle of this invention has a special double boom assembly that that is connected to a winch with a special multi-axis hinge or joint that allows for rotation, tilting, and collapsing of the double boom assembly while securely holding the motorcycle or electric bike.

2. Description of Related Art

There are other vehicle racks for a motorcycles and electric bikes in the prior art. However, none have the complex specific structure shown and described below. The motorcycle or electric bike rack for a vehicle has a primary boom and a secondary boom that are both connected to a winch with a lifting strap threaded through the primary boom. The primary and secondary booms are attached to the winch with a very special multi-axis hinge or joint that allows the primary and secondary booms to tilt, rotate, extend, and collapse with respect to the winch while still remaining very sturdy and strong to securely hold a very heavy motorcycle or very heavy electric bike. There are other aspects of motorcycle or electric bike rack for a vehicle that are not present in the prior art, as discussed below.

BRIEF SUMMARY OF THE INVENTION

It is an aspect of motorcycle or electric bike rack for a vehicle to be reversely attachable to a vehicle.

It is an aspect of motorcycle or electric bike rack for a vehicle to have a winch with a support strap or chain.

It is an aspect of motorcycle or electric bike rack for a vehicle to have a primary boom and a secondary boom.

It is an aspect of the primary boom to have the support strap or chain threaded though the primary boom.

It is an aspect of the primary boom and the secondary boom to be connected together to form an assembly.

It is an aspect of the primary boom and secondary boom assembly to be connected to the winch by a special multi-axis hinge or joint.

It is an aspect of the special multi-axis hinge or joint to tilt, rotate, extend, and collapse with respect to the winch while still remaining sturdy and strong enough to hold a heavy motorcycle or electric bike.

It is an aspect of the special multi-axis hinge or joint to have a turntable member or rotating joint member.

It is an aspect of the special multi-axis hinge or joint to have a pivoting member or axle joint member.

It is an aspect of the pivoting member or axle joint member to be off-set or staggered from the pivoting member or axle joint member by a certain distance to yield proper tilting, rotating, extending, and collapsing of the primary boom and secondary boom assembly.

It is an aspect of the pivoting member or axle joint member to be positioned above the pivoting member or axle joint member and held by two support wings in order to yield proper tilting, rotating, extending, and collapsing of the primary boom and secondary boom assembly.

It is an aspect of motorcycle or electric bike rack for a vehicle to have the winch attached to a base plate or foundation member that could be a separate plate or simply part of a vehicle such as: roof, tailgate, bedside, door, bumper, trailer hitch, or any other party of the vehicle.

BRIEF DESCRIPTION OF THE DRAWINGS

Figures 3, 4:
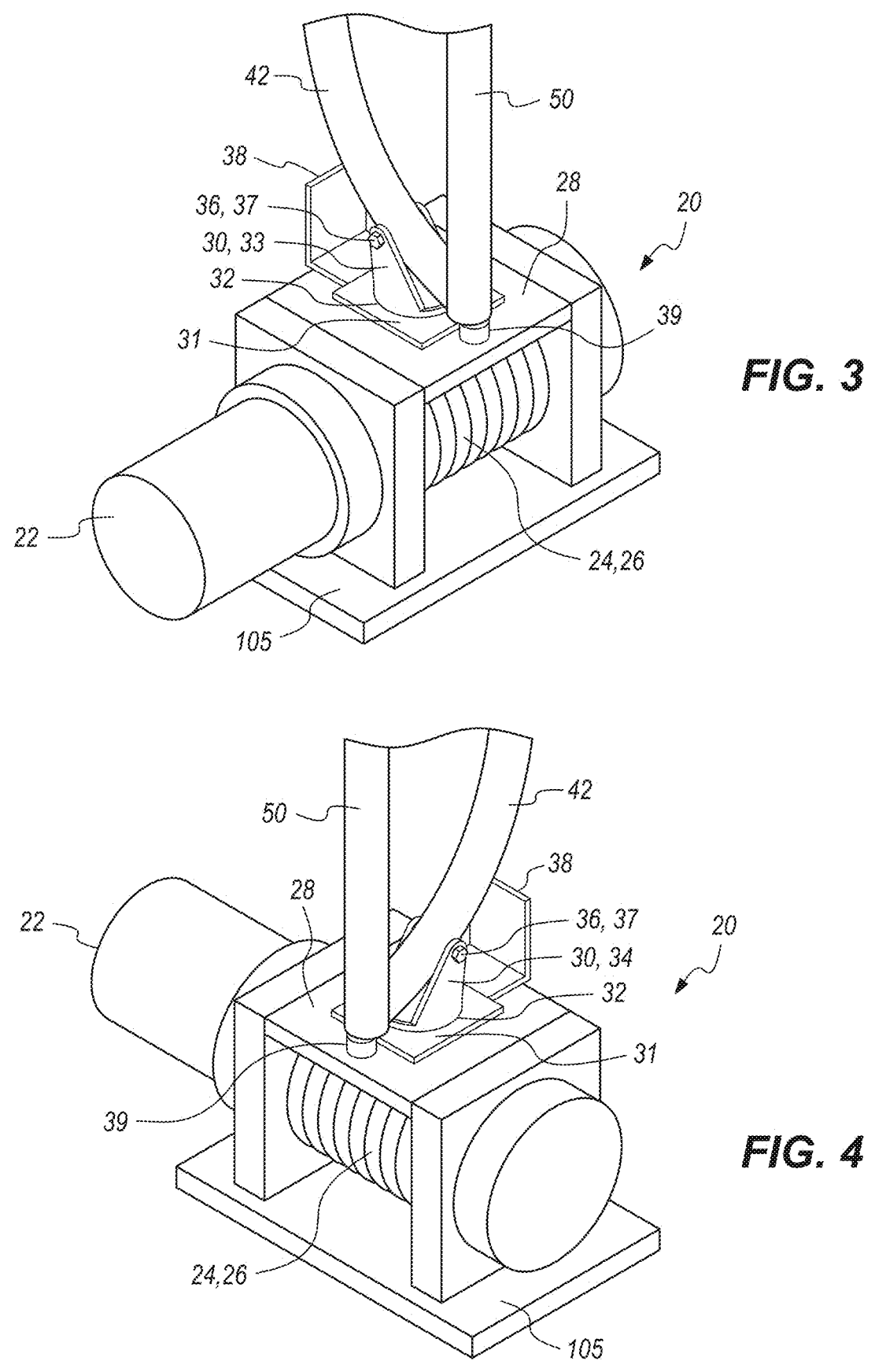

FIG. 3 is an enlarged perspective view of the first side multi-axis hinge or joint 30.

FIG. 4 is an enlarged perspective view of the second side multi-axis hinge or joint 30.

Figures 1, 2:
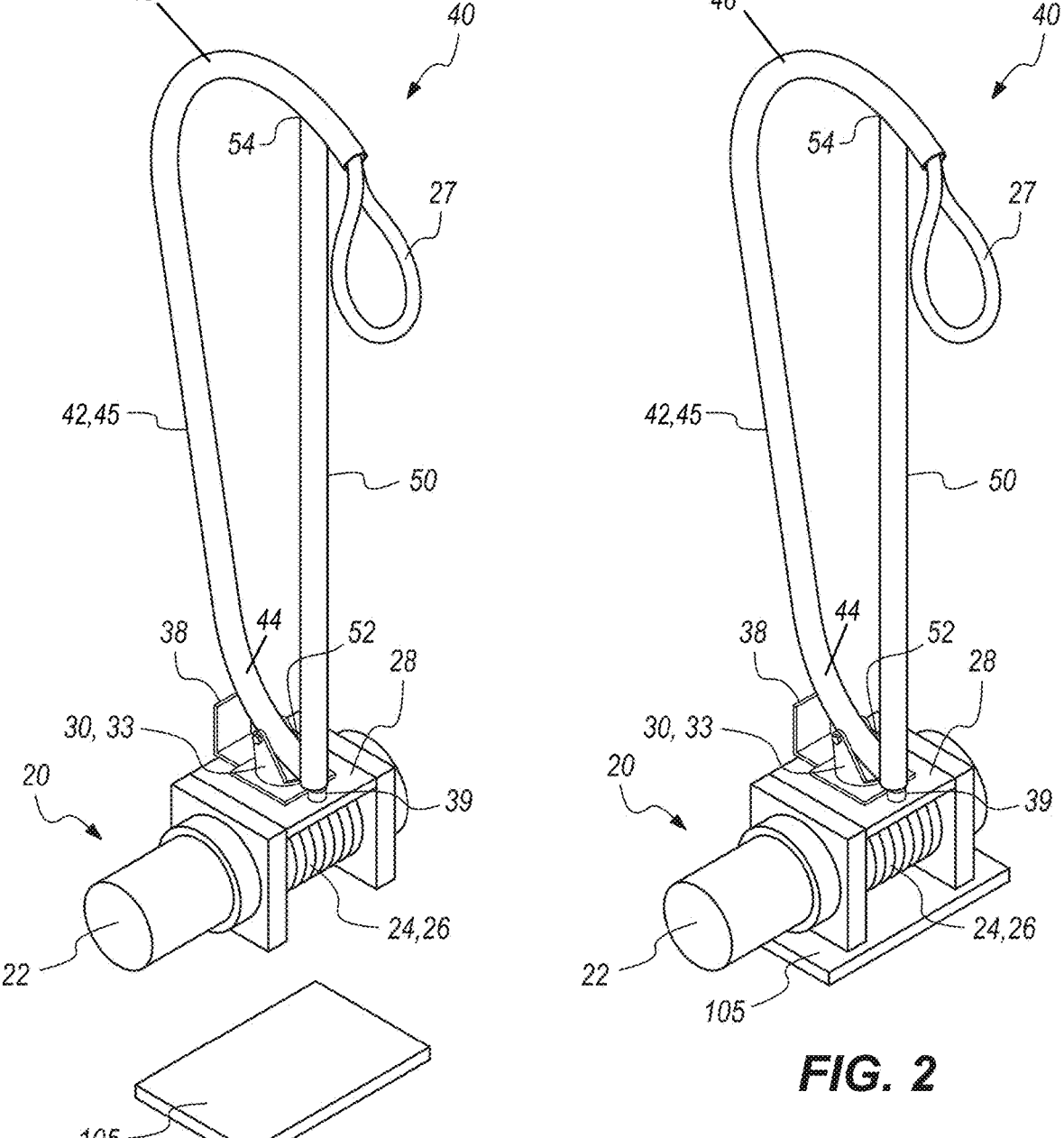
FIG. 1 is a perspective view of winch 20, multi-axis hinge or joint 30, and double boom assembly 40, which is the base embodiment of motorcycle or electric bike rack for a vehicle 5, floating above base plate or foundation member 10.
FIG. 2 is a perspective view of winch 20, multi-axis hinge or joint 30, and double boom assembly 40, which is the base embodiment of motorcycle or electric bike rack for a vehicle 5, attached to base plate or foundation member 10.

| DEFINITION LIST | |
| --- | --- |
| Term | Definition |
| 5 | Motorcycle or Electric Bike Rack for a Vehicle |
| 20 | Winch |
| 22 | Motor |
| 24 | Drum |
| 26 | Winch Line |
| 27 | Winch Hook |
| 28 | Fairlead |
| 30 | Multi-Axis Hinge or Joint |
| 31 | Plinth |
| 32 | Platter |
| 33 | First Wing |
| 34 | Second Wing |
| 35 | Axle Mounting Hole |
| 36 | Axle |
| 37 | Axle Nut |
| 38 | Inner Stop |
| 39 | Outer Stop |
| 40 | Double Boom Assembly |
| 42 | Primary Boom |
| 44 | Lower Bow of Primary Boom |
| 45 | Middle Section of Primary Boom |
| 46 | Upper Bow of Primary Boom |
| 50 | Secondary Boom |
| 52 | Lower Attachment Point of Secondary Boom |
| 54 | Upper Attachment Point of Secondary Boom |
| 60 | Muli-Sport Rack or Bike Rack |
| 62 | Inner Base Rail |
| 63 | Outer Base Rail |
| 64 | Front Stanchion Assembly |
| 65 | Front Ratcheting Tire Clamp |
| 66 | Rear Stanchion Assembly |
| 67 | Rear Ratcheting Tire Clamp |
| 100 | Vehicle |
| 105 | Bracket or Bracket Assembly |
| 110 | Motorcycle or Electric Bike |

DETAILED DESCRIPTION OF THE INVENTION

Motorcycle or electric bike rack for a vehicle 5 is reversibly rigidly attachable to a vehicle. The vehicle could be a car, pickup truck, truck, van, or any other type of motor vehicle.

Please note that throughout this writing, front or frontwards references the end or direction that is adjacent to the front of the vehicle that the motorcycle or electric bike rack for a vehicle 5 is attached to. Likewise, rear or rearwards references the end or direction that is adjacent to the rear of the vehicle. Inner or inside references the end or direction that is adjacent to the vehicle. Outer or outside references the end or direction that is not adjacent to or opposite to the vehicle.

Motorcycle or electric bike rack for a vehicle 5 comprises: a winch 20; a multi-axis hinge or joint 30; and a double boom assembly 40.

Winch 20 is a mechanical device that is used to pull in (wind up) or let out (wind out) or otherwise adjust the tension of a rope, wire, strap, or cable. Winch 20 is a winch in the common definition of the word. Winch 20 may be any known type of winch such as: electric winch, hydraulic winch, or pneumatic winch. In best mode winch 20 is an electric winch because most, if not all, vehicles have a 12-volt electrical system that can be easily connected to the winch 20.

Winch 20 comprises: a motor 22; a drum 24; a winch line 26; a winch hook 27; and a fairlead 28.

Motor 22 is a machine that supplies motive power to rotate a driveshaft. Driveshaft has: a first end, a second end, a length, an outside diameter, and a longitudinal axis. The driveshaft is rigidly attached to the drum 24 so that these members rotate in concert. Motor 22 may be any know type of motor such as: internal combustion motor, hydraulic motor, pneumatic motor, or electric motor. Motor 22 has a locking mechanism which locks the motor 22 when not in use, where the locking mechanism is a heavy duty mechanism that can support the entire weight of the motorcycle or electric bike 110 plus the weight of the double boom assembly 40 without breaking free. In best mode, motor 22 is an electric motor. In the case of an electric motor, motor 22 is connected to a power source such as the vehicle's electrical system, battery, or alternator that there is electrical continuity there between.

Drum 24 is a rigid cylindrical container, spool, or reel. Drum 24 functions to receive the winch line 26 and store the winch line 26 on the drum 24. Drum 24 has: an upper side, a lower side, inner side, outer side, a first flange, a second flange, a length, an outside diameter, and a longitudinal axis. The first flange is forward when the motorcycle or electric bike rack for a vehicle 5 is attached to the driver's side of the vehicle. The second flange is forward when the motorcycle or electric bike rack for a vehicle 5 is attached to the passenger's side of the vehicle. The drum 24 is pivotally attached to the first flange and the second flange so that the drum 24 rotates while the first flange and the second flange remain still relative to the vehicle. Drum 24 is rigidly attached to the second end of the driveshaft of the motor 22 so that the longitudinal axis the drum 24 and the longitudinal axis the driveshaft are coincident. The first end of the driveshaft is rigidly attached to the motor 22. As with all winches, when the motor 22 rotates, the drum 24 rotates in the same direction. The motor 22 rotates in one direction to wind in the winch line 26 and rotates in the other direction to let out the winch line 26. As stated above, when motor 22 is not in use, there is a heavy duty locking mechanism that prevents motor 22 from rotating. Thus, drum 24 is also prevented from rotating when motor 22 is not in use. The lower side of drum 24 is rigidly attached to bracket or bracket assembly 105. This attachment is reversible so that the motorcycle or electric bike rack for a vehicle 5 may be attached to and removed from the base plate 10.

Winch line 26 is a length of cordage such as: a strap, a rope, a chain, or a cable. Winch line 26 has: a length, a first end, a second end, and outer diameter. The first end of winch line 26 is attached to the drum 24. The second end of winch line 26 is attached to the winch hook 27. The length of winch line could is about 2-20 feet. Winch line 26 is coiled around the drum 24 and stored on the drum 24. The winch 20 rotates in one direction to coil the winch line 26 around it and rotations in the other direction to unwind the winch line 26 from the drum 24.

Winch hook 27 is a connector. Winch hook 27 is reversibly attachable to a motorcycle or electric bike 110. Any known type of connector may be used for winch hook 27. Winch hook 27 may be a hook in the common definition of the word. Winch hook 27 may be a loop in the common definition of the word, as depicted.

Fairlead 28 is a special plate that is mounted on the upper side of drum 24. Fairlead 28 functions to help neatly coil the winch line 26 around the drum 24 and to help neatly unwind the winch line 26 from the drum 24 without the winch line 26 getting tangled. Thus, fairlead 28 prevents the winch line from getting tangled or snagged while winding and unwinding. Fairlead 28 may have a travelling line guide or a traveler that moves back and forth with the windings of the winch line 26 to keep the winch line neatly coiled. Alternately, fairlead 28 may just have a non-moving central pathway for the winch line 26 that keeps the winch line neatly coiled. Alternately, fairlead 28 may be a smooth bar or lip at the entrance of the drum 24 that keeps the winch line 26 neatly coiled.

Fairlead 28 also functions as special support plate or mounting plate for the multi-axis hinge or joint 30. Fairlead 28 has a rigid horizontal plate member with: an upper surface, lower surface, inner edge, outer edge, a first edge, a second edge, a length, a width, a thickness, and a plane. The lower surface of fairlead 28 is rigidly attached to the upper side of the drum 24. The lower surface of fairlead 28 of fairlead 28 is rigidly attached to the first flange and the second flange of the drum 24 or other stationary part of the drum 24, such as the bolts connecting the front and second flanges. The lower surface of fairlead 28 does not rotate with the drum 24. The lower surface of fairlead 28 is stationary with respect to the motorcycle or electric bike rack for a vehicle 5.

Multi-axis hinge or joint 30 is a custom designed moveable joint, bearing, or mechanism that pivotally attaches and rotateably attaches the double boom assembly 40 to the winch 20. Thus, the multi-axis hinge or joint 30 is pivotally and rotateably attached to the fairlead 28 and the double boom assembly 40.

Multi-axis hinge or joint 30 comprises: a plinth 31; a platter 32; a first wing 33; a second wing 34; an axle 36; two axle nuts 37; an inner stop 38; and an outer stop 39.

Plinth 31 is a rigid rectangular or square shaped horizontal planer member with: an upper surface, lower surface, inner edge, outer edge, a first edge, a second edge, a length, a width, a thickness, and a plane. The lower surface of plinth 31 is rigidly attached to the upper surface of fairlead 28 so that the plane of plinth 31 is horizontal and parallel with the plane of fairlead 28. Plinth 31 does not rotate. Thus, the plinth 31 is stationary with respect to the motorcycle or electric bike rack for a vehicle 5.

Platter 32 is a rigid circular shaped horizontal planer member with: an upper surface, lower surface, inner edge, outer edge, a first edge, a second edge, a center, a circumference, an outer diameter, a thickness, and a plane. The center of plater 32 is pivotally attached to the plinth 31 so that the plane of platter 32 is horizontal and parallel with the plane of plinth 31. The lower surface of platter 32 is pivotally attached to the upper side of plinth 31 so that the plane of platter 32 is horizontal and parallel with the plane of plinth 31. Thus, the platter 32 rotates on the plinth 31 in the same way that a record album turntable rotates in order to play a record album. The platter 32 freely rotates around the plinth 31 in both the clockwise and counterclockwise direction without restriction. Rotation without restriction is desired here for ease of loading and unloading of the motorcycle or electric bike, as discussed below. Rotation without restriction is possible here because of the special design of the motorcycle or electric bike rack for a vehicle 5 that yields perfect balance of the double boom assembly 40 on top of the multi-axis hinge or joint 30 with a heavy motorcycle or electric bike attached to it, as discussed below. The perfect balance prevents the motorcycle or electric bike from tipping over or becoming unstable while loading and unloading of the motorcycle or electric bike, as discussed below. Pivotal attachment and rotation may be accomplished by any known means such as: a rotating bearing, spindle, axle, or any other known means. Pivotal attachment must be accomplished by a heavy duty and sturdy means because the entire weight of the motorcycle or electric bike will be hanging and supported by this pivotal attachment. Any known means of pivotal attachment may be used to accomplish this. There are many types of pivotal attachment bearings. In best mode, pivotal attachment is accomplished by a heavy duty bearing with: an inner race and an outer race that are separated by a plurality of ball bearings.

First wing 33 is a rigid wing-shaped vertical planer member with: a first surface, a second surface, an upper edge, a lower edge, an inner edge, an outer edge, a thickness, and a plane. First wing 33 is wing-shaped or lobe-shaped with a wider dimension on the lower edge than that of the upper edge. Thus, the lower edge is the wing base and the upper edge is the wing tip. The lower edge of first wing 33 is rigidly attached to the upper surface of platter 32 adjacent to the circumference or near the outer edge of the platter 32. The outer edge or wing tip the first wing 33 points upwards at a diagonal that is not vertical or horizontal, but in between, at an angle of about 35-55 degrees from horizontal. This orientation helps with the balancing of double boom assembly 40, as discussed below. The outer edge or wing tip the first wing 33 has an axle mounting hole 35. Axle mounting hole 35 is a circular hole that is sized to make a slip fit or press fit with the axle 36. Axle mounting hole 35 is a perpendicular hole that runs perpendicular to the plane of first wing 33.

Second wing 34 is a rigid wing-shaped vertical planer member with: a first surface, a second surface, an upper edge, a lower edge, an inner edge, an outer edge, a thickness, and a plane. Second wing 34 is wing-shaped or lobe-shaped with a wider dimension on the lower edge than that of the upper edge. Thus, the lower edge is the wing base and the upper edge is the wing tip. The lower edge of second wing 34 is rigidly attached to the upper surface of platter 32 adjacent to the circumference or near the outer edge of the platter 32. The outer edge or wing tip the second wing 34 points upwards at a diagonal that is not vertical or horizontal, but in between, at an angle of about 35-55 degrees from horizontal. This orientation helps with the balancing of double boom assembly 40, as discussed below. The outer edge or wing tip the second wing 34 has an axle mounting hole 35. Axle mounting hole 35 is a circular hole that is sized to make a press fit or interference fit with the axle 36. Axle mounting hole 35 is a perpendicular hole that runs perpendicular to the plane of second wing 34. Second wing 34 is the same shape as first wing 33.

Axle 36 is a rod or spindle. Axle 36 is an axle in the common definition the word. Axle 36 is a rigid horizontal cylindrical member with: a first end, a second end, an outer diameter, a length, and a longitudinal axis. Axle 36 is installed into the axle mounting holes 35 of the first wing 33 and the second wing 34, as depicted. Axle 36 is installed in a rigid fashion so that it does not rotate. Axle 36 does not move relative to first wing 33 and second wing 34. After axle 36 is installed, one of the two axle nuts 37 is installed on the first end of axle 36 and the second axle nut 37 is installed on the second end of axle 36. In best mode, axle 36 has male thread at the first end and male thread at the second end that is sized to engage with female thread on each of the two axle nuts 37.

Each of the two axle nuts 37 is a fastener that is rigidly attached to axle 36, one axle nut 37 at the first end, of axle 36 and the second axle nut 37 at the second end of axle 36. Axle nuts 37 function to keep the axle 36 firmly in place, in between first wing three and second wing 34. Axle nuts 37 prevent the axle 36 from sliding back-and-forth. Axle nuts 37 function to keep the double boom assembly 40 firmly in between first wing 33 and second wing 34. In best mode, each of the two axle nuts 37 is a nut in the common definition of the word. In best mode each of the two axle nuts 37 has female thread that is sized to engage with male thread on the first and second ends of axle 36.

Double boom assembly 40 comprises: a primary boom 42 and a secondary boom 50.

Primary boom 42 is a rigid arced member or curved member. The arc or curve of primary boom 42 is a general C-shape or at least a C-shape that is slanted downward on the open end. Primary boom 42 has: a lower bow 44, a middle section 45, and an upper bow 46.

Lower bow 44 is a rigid arced segment or curved segment. Lower bow 44 has a lower end and an upper end. The lower end of lower bow 44 has a longitudinal axis that points downwards and sideways. The upper end of lower bow 44 has a longitudinal axis that points upwards. The rigid arced segment or curved segment of lower bow 44 is such that the longitudinal axis of the lower end forms a 95-175 degree angle with the longitudinal axis of the upper end. In best mode, this angle is 125-145 degrees. The upper end of lower bow 44 is rigidly attached to the lower end of middle section 45.

Middle section 45 is a rigid linear segment or straight segment. Middle section 45 has a lower end and an upper end. The lower end of middle section 45 has a longitudinal axis that points downwards. The upper end of middle section 45 has a longitudinal axis that points upwards. The longitudinal axes of the lower end and upper end are coincident. The lower end of middle section 45 is rigidly attached to the upper end of lower bow 44. The upper end of middle section 45 is rigidly attached to the inner end of upper bow 56.

Upper bow 46 is a rigid arced segment or curved segment. Upper bow 46 has an inner end and an outer end. The inner end of upper bow 46 has a longitudinal axis that points generally downwards. The outer end of upper bow 46 has a longitudinal axis that points downwards at about a 45-degree angle. The outer end of upper bow 46 is the very top of primary boom 42 where the winch line 26 and winch hook 27 are located. The rigid arced segment or curved segment of upper bow 46 is such that the longitudinal axis of the inner end forms a 95-175 degree angle with the longitudinal axis of the outer end. In best mode, this angle is 125-145 degrees. The inner end of upper bow 46 is rigidly attached to the upper end of middle section 45.

In this way, the primary boom 42 is a rigid arc member or curved member that forms a general C-shape or at least a C-shape that is slanted downward at the open end. Primary boom 42 may be made of any known material such as: metal, steel, aluminum, polymer, plastic, composite, wood, fiberglass, ceramic, carbon fiber, or any other known material. In best mode, primary boom 42 is one single piece of material where the lower bow 44, middle section 45, and upper bow 46 are made from one piece of material. Primary boom 42 may be rigid solid material or rigid hollow tubular material. In best mode, primary boom 42 is made of rigid hollow tubular material to save weight.

Primary boom 42 functions to support the entire weight of the motorcycle or electric bike 110. As stated, in best mode, primary boom 42 is a hollow or tubular member in order to save weight. Because of this design, a secondary boom 50 is required to help support the weight of motorcycle or electric bike 110 and to prevent the primary boom 42 from bending or kinking. If the primary boom 42 were a solid piece of metal structure, then the secondary boom 50 may not be required. However, in order to provide a robust and strong design, the secondary boom 50 is included.

Primary boom 42 may further comprise: a first axle bearing (not depicted) and a second axle bearing (not depicted). First axle bearing is identical to second axle bearing. Each axle bearing is attached to the lower bow 44 of primary boom 42. Each axle bearing is attached so that it is aligned with the other axle bearing. Each axle bearing has a horizontal longitudinal axis that is coincident with the horizontal longitudinal axis the other axle bearing. Each axle bearing is perfectly aligned on one horizontal axis to allow the double boom assembly 40 to freely pivot around the axle 36 without binding. A bearing is a machine element that constrains relative motion to only the desired motion and reduces friction between moving parts. Each axle bearing is an axle bearing or circular bearing in the common definition of the words. Each axle bearing is a circular bearing with an inner race that freely rotates around an outer race. Each outer race is rigidly attached to the primary boom 42. Each inner race can freely rotate around the outer race. Each inner race is rigidly attached to the axle 36. Each axle bearing has an inner diameter that is sized to make a press fit or interference fit with the outer diameter of axle 36. Each axle bearing has an outer diameter that is sized to make press fit or interference fit with a circular bearing mounting hole in the primary boom 42. The inner race of first axle bearing is rigidly attached to the first end of axle 36. The inner race of second axle bearing is rigidly attached to the second end of axle 36. Any known type of axle bearing or circular bearing may be used.

Secondary boom 50 is a rigid linear member or straight member. Secondary boom 50 has a lower end, a middle section, and an upper end. The lower end of secondary boom 50 has a longitudinal axis that points downwards. The upper end of secondary boom 50 has a longitudinal axis that points upwards. The longitudinal axes of the lower end and upper end are coincident.

The lower end of lower bow 44 of primary boom 42 is rigidly attached to the lower end of secondary boom 50 or the middle section of secondary boom just adjacent to the lower end of secondary boom 50, as depicted. This attachment point is referenced and labeled as lower attachment point 52. The upper end of secondary boom 50 is rigidly attached to a point adjacent to the outer end of upper bow 56. The upper end of secondary boom 50 is attached to a segment of upper bow 46 that is adjacent to the outer end. The upper end of secondary boom 50 is not attached to the very outer end of upper bow 46 but rather attached to a segment of upper bow 46 that is just adjacent to the outer end, as depicted. This attachment point is referenced ad labelled as upper attachment point 54.

Inner stop 38 is a rigid vertical support member projecting upwards from the upper surface of the plinth 31 adjacent to the first edge of the plinth 31 or the upper surface of the fairlead 28 adjacent to the first edge of the fairlead 28. Inner stop 38 is a rigid and strong member that can support the entire weight of the motorcycle or electric bike 110 plus the weight of the double boom assembly 40. The specific shape of inner stop 38 is not important. Inner stop 38 just must be a strong rigid vertical member. Inner stop 38 functions to prevent double boom assembly 40 from tilting all the way inward to contact the vehicle 100 or collapsing onto the vehicle 100. Since multi-axis hinge or joint 30 is freely rotating and freely tilting, there must be an inner stop 38 to prevent the double boom assembly 40 from contacting the vehicle 100. As stated above, multi-axis hinge or joint 30 is freely rotating and freely tilting to make it easier to load and unload the motorcycle or electric bike 110 from the motorcycle or electric bike rack for a vehicle 5. In best mode, inner stop 38 is a rigid vertical rectangular or square member that is rigidly attached to the upper surface of the fairlead 28, adjacent to the first edge of the fairlead 28, as depicted. In best mode, inner stop 38 has an elastomeric bumper member (not depicted) at the contact point between the double boom assembly 40 and outer stop 39 in order to prevent scratching and dinging of the double boom assembly 40.

Outer stop 39 is a rigid foot member rigidly attached to the lower end of secondary boom 50. Outer stop 39 is a rigid and strong member that can support the entire weight of the motorcycle or electric bike 110 plus the weight of the double boom assembly 40. The specific shape of outer stop 39 is not important. Outer stop 39 just must be a strong rigid vertical member. Outer stop 39 functions to prevent double boom assembly 40 from tilting all the way outward to drop the motorcycle or electric bike 110 onto the ground or collapsing onto the ground. Since multi-axis hinge or joint 30 is freely rotating and freely tilting, there must be an outer stop 39 to prevent the double boom assembly 40 from collapsing onto the ground. As stated above, multi-axis hinge or joint 30 is freely rotating and freely tilting to make it easier to load and unload the motorcycle or electric bike 110 from the motorcycle or electric bike rack for a vehicle 5. In best mode, outer stop 39 has an elastomeric bumper member at the contact point between the fairlead 28 and outer stop 39 in order to prevent scratching and dinging of the motorcycle or electric bike rack for a vehicle 5.

In best mode, there is a locking mechanism that retains the double boom assembly 40 and holds it in place as it is resting on the inner stop 38. This locking mechanism is required in the base embodiment. This locking mechanism holds the motorcycle or electric bike 110 during transport and prevents the double boom assembly from leaning outward to rest on the outer stop 39 during transport. Any known type of locking mechanism may be used for this purpose, such as a locking pin that locks double boom assembly 40 to the multi-axis hinge or joint 30, with the double boom assembly 40 resting on the inner stop 38.

The special structure and special geometric shape of the double boom assembly 40 is the reason why there is such perfect balance of the double boom assembly 40 holding a heavy motorcycle or electric bike 110. This structure allows a heavy motorcycle or electric bike 110 to be hoisted up from the ground, tilted, and rotated with very little force from the user. This special structure includes the primary boom 42, with lower bow 44, middle section 45, and upper bow 46. This special structure also includes the secondary boom 50 with the lower attachment point 52 and upper at attachment point 54.

A heavy motorcycle or electric bike 110 may be supported by the structure detailed above because of the heavy duty locking mechanism in the motor 22 of the winch 20. No additional structure would be required to support a heavy motorcycle or electric bike 110. Thus, the above structure, describes the base embodiment of motorcycle or electric bike rack for a vehicle 5. This embodiment could be a no-frills low cost basic embodiment for certain users who require such.

In all embodiments, motorcycle or electric bike rack for a vehicle 5 is must be rigidly attached to the vehicle 100 in some way shape or form. The exact method of rigid attachment is not important to this invention. The important thing is that the motorcycle or electric bike rack for a vehicle 5 is somehow rigidly attached to the vehicle 100. Applicant may be biased, however, applicant believes that the best way to rigidly attach motorcycle or electric bike rack for a vehicle 5 to a vehicle 100 is using the devices shown and described in U.S. Pat. Nos. 12,269,432 and 12,403,842 that were patented by the applicant. In any form of attachment, motorcycle or electric bike rack for a vehicle 5 is rigidly attached to a bracket or bracket assembly 105, which, in turn, is rigidly attached to the vehicle 100. Bracket or bracket assembly 105 is not a part of this invention.

Bracket or bracket assembly 105 is a rigid planer member that is sturdy and heavy or otherwise remains solid and stationary with respect to the vehicle. Bracket or bracket assembly 105 is simply a base, pedestal, or foundation on which the motorcycle or electric bike rack for a vehicle 5 is rigidly attached and mounted. Bracket or bracket assembly 105 could be a sturdy and heavy plate. Bracket or bracket assembly 105 could also just be a sturdy mounting point on the vehicle such as: the vehicle's roof, fender, bedside, tailgate, bumper, trailer hitch, hitch receiver mounted platform, or any other sturdy foundation member that is attached to a vehicle. If bracket or bracket assembly 105 is not an original part of the vehicle, bracket or bracket assembly 105 must be reversibly rigidly attachable to the vehicle. If base plate is already a part of the vehicle, the bracket or bracket assembly 105 is already rigidly attached to the vehicle. Thus, motorcycle or electric bike rack for a vehicle 5 should only be attached to a very solid part of the vehicle.

Figure 5:
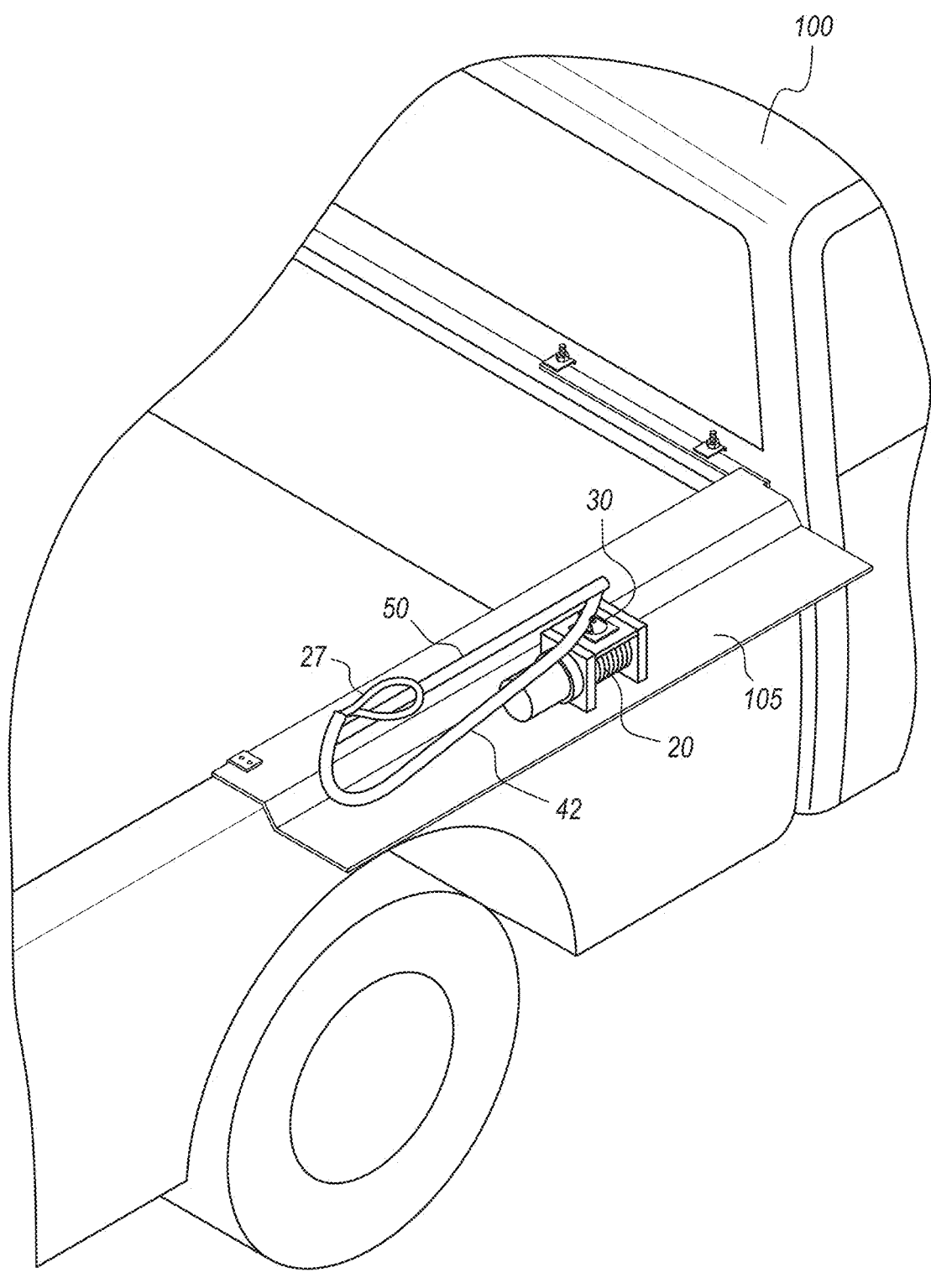
FIG. 5 is a perspective view of motorcycle or electric bike rack for a vehicle 5 attached to a bracket or bracket assembly 105, which is attached to a vehicle 100, wherein the double boom assembly 40 is collapsed and in the stow position, without a motorcycle or electric bike 110. This figure depicts how the motorcycle or electric bike rack for a vehicle 5 looks when attached to a vehicle 100 and traveling on the roadways without a motorcycle or electric bike 110 attached.
Figure 6:
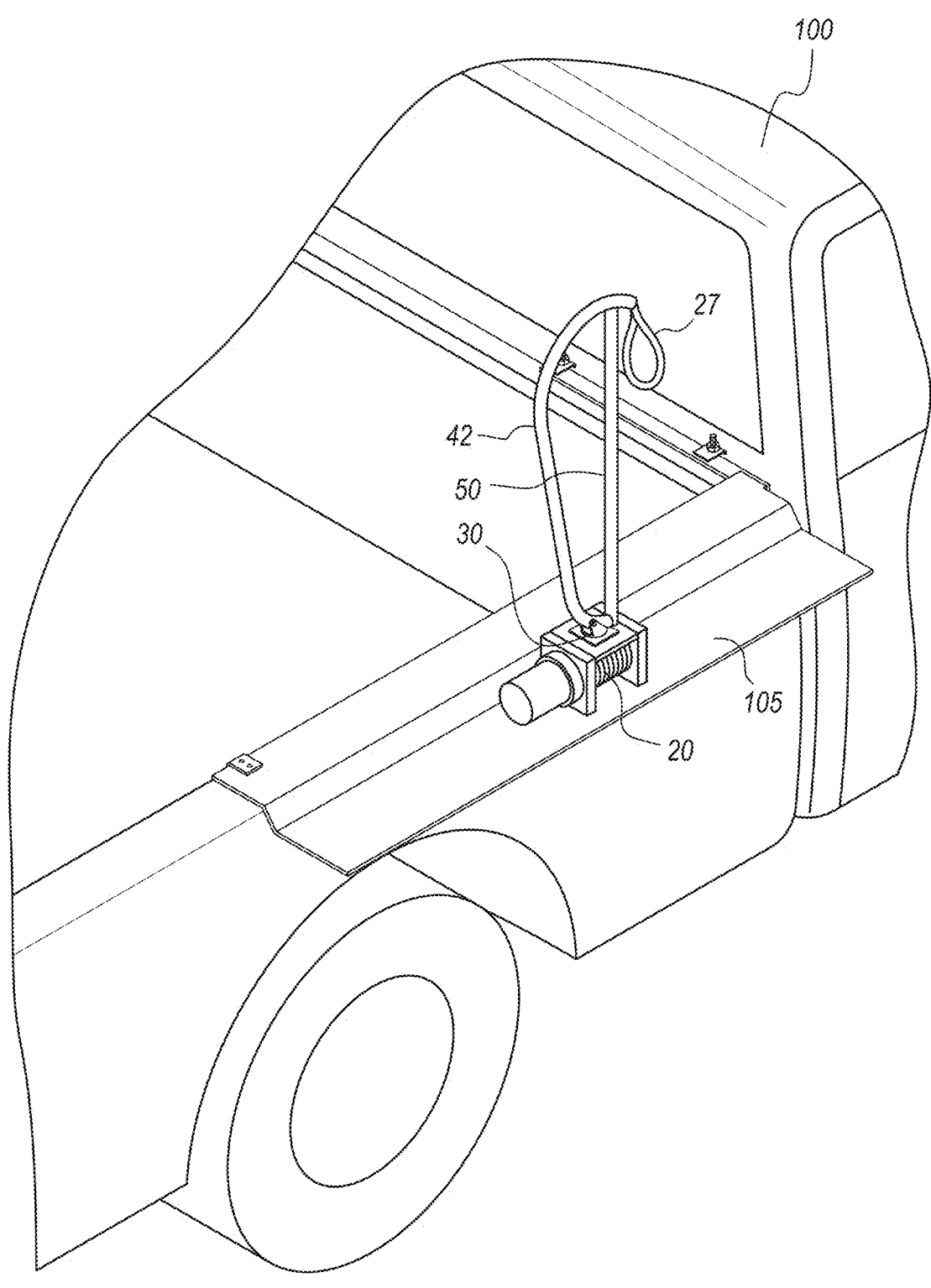
FIG. 6 is a perspective view of motorcycle or electric bike rack for a vehicle 5 attached to a bracket or bracket assembly 105, which is attached to a vehicle 100, wherein the double boom assembly 40 is in the erect position with the winch hook 27 facing forward, without a motorcycle or electric bike 110.
Figure 7:
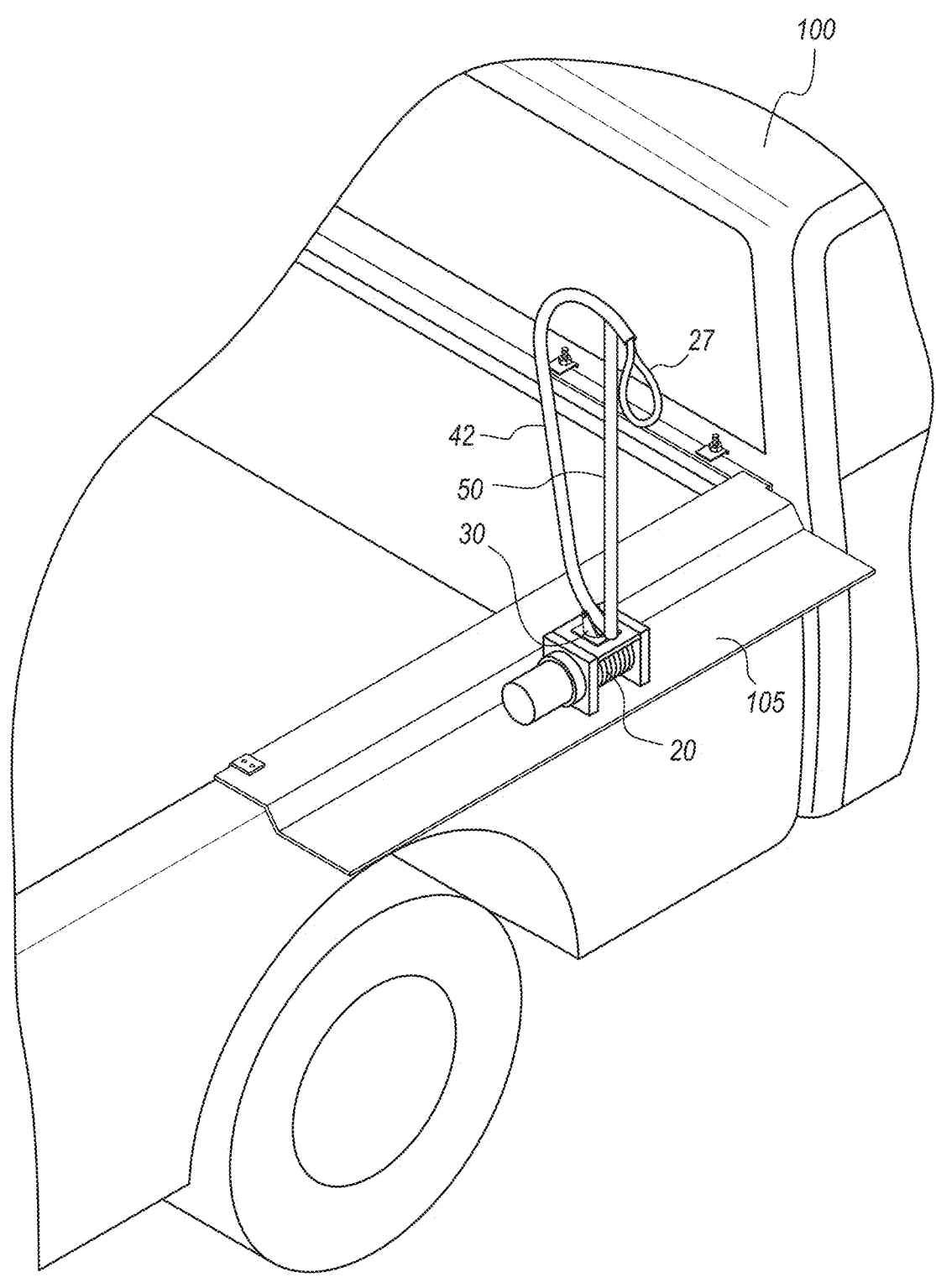
FIG. 7 is a perspective view of motorcycle or electric bike rack for a vehicle 5 attached to a bracket or bracket assembly 105, which is attached to a vehicle 100, wherein the double boom assembly 40 is in the erect position, resting on the outer stop 39, with the winch hook 27 facing outward, without a motorcycle or electric bike 110.
Figure 8:
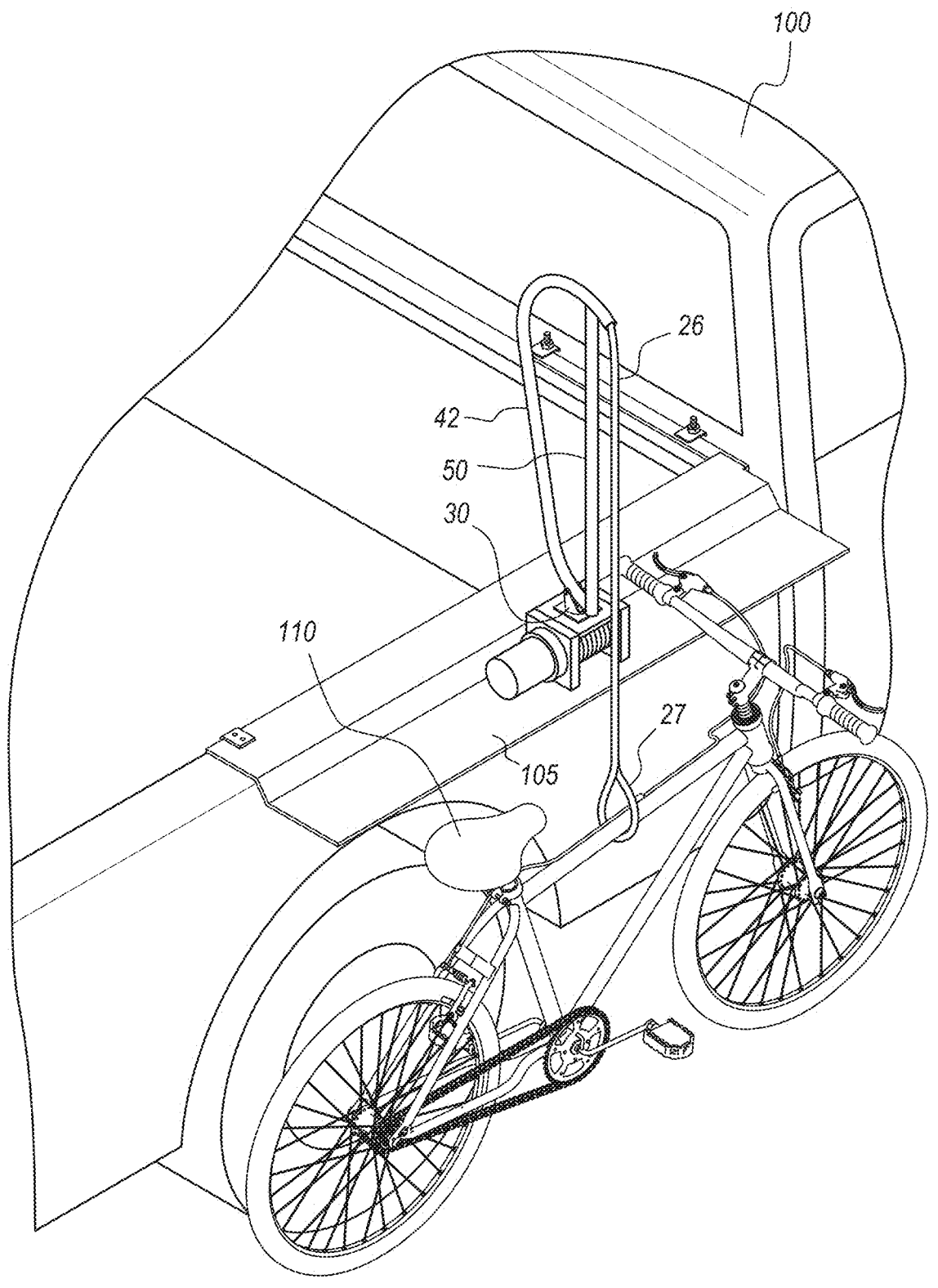
FIG. 8 is a perspective view of motorcycle or electric bike rack for a vehicle 5 attached to a bracket or bracket assembly 105, which is attached to a vehicle 100, wherein the double boom assembly 40 is in the erect position, resting on the outer stop 39, the winch hook 27 facing outward, the winch line 26 and the winch hook 27 lowered, and the winch hook 27 attached to a motorcycle or electric bike 110.
Figure 9:
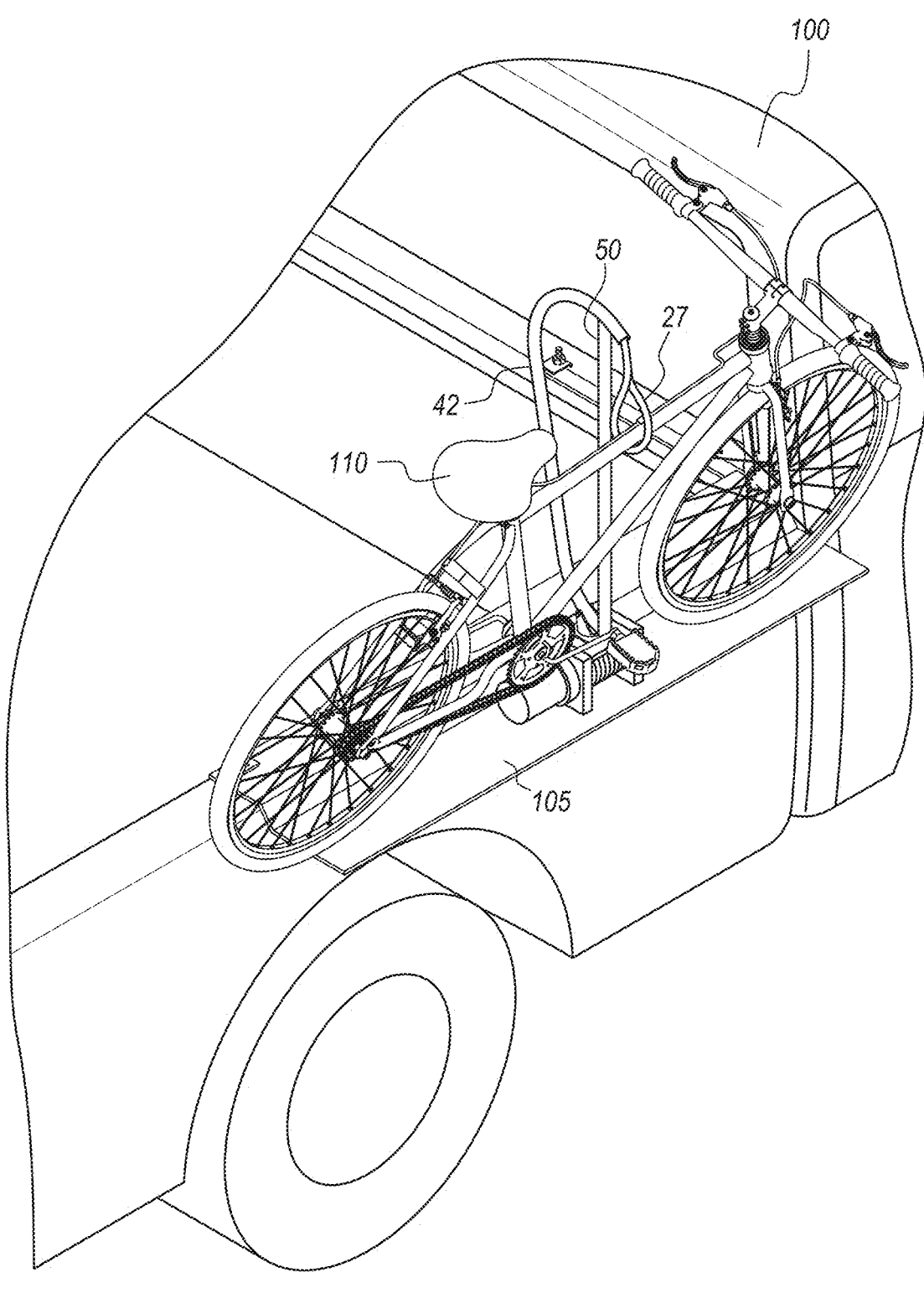
FIG. 9 is a perspective view of motorcycle or electric bike rack for a vehicle 5 attached to a bracket or bracket assembly 105, which is attached to a vehicle 100, wherein the double boom assembly 40 is in the erect position, resting on the inner stop 38, the winch hook 27 facing outward, the winch hook 27 attached to a motorcycle or electric bike 110, and the winch line 26 and the winch hook 27 raised.
Figure 10:
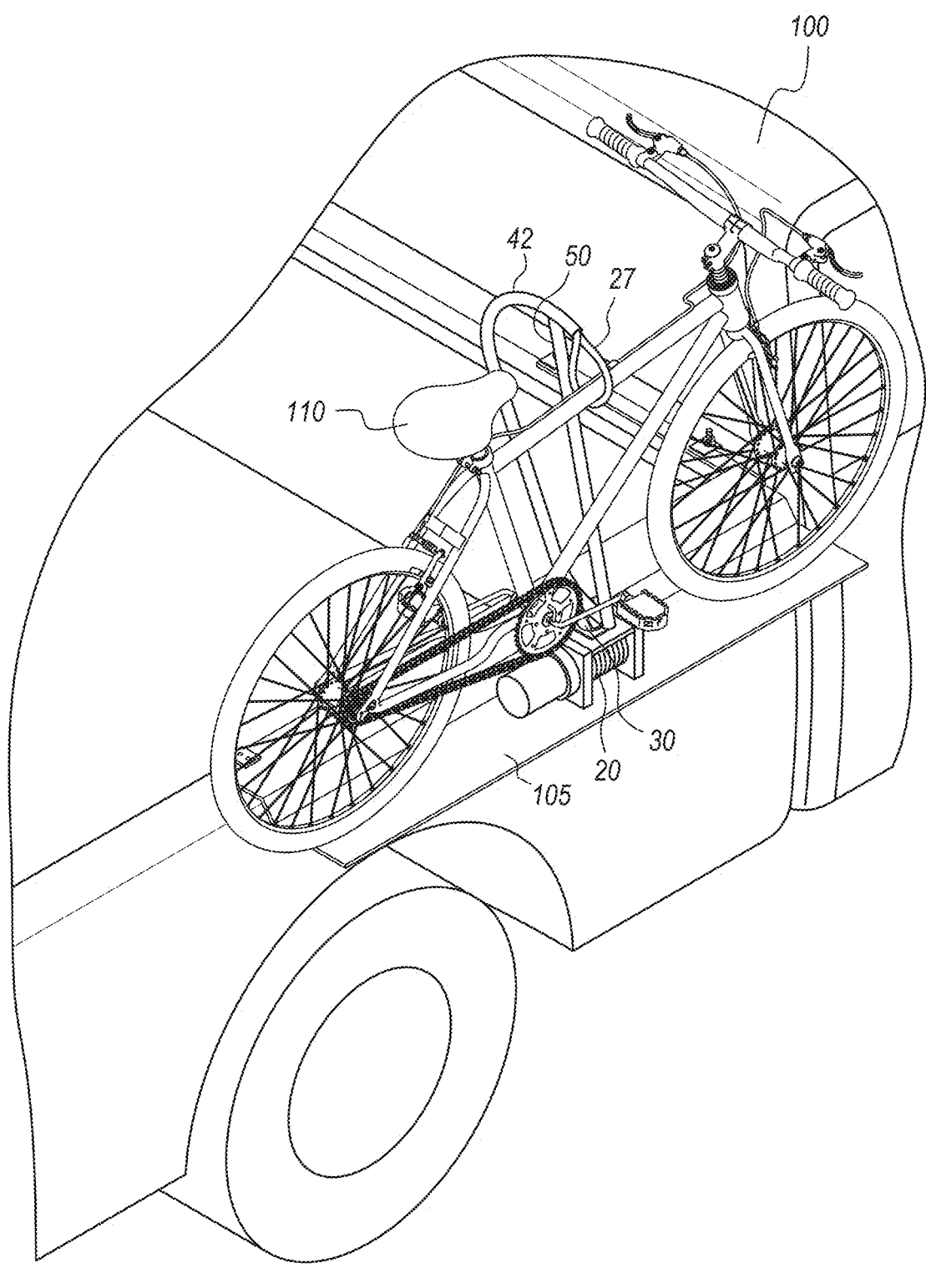
FIG. 10 is a perspective view of motorcycle or electric bike rack for a vehicle 5 attached to a bracket or bracket assembly 105, which is attached to a vehicle 100, wherein the double boom assembly 40 is in the erect position, the winch hook 27 facing outward, the winch hook 27 attached to a motorcycle or electric bike 110, the winch line 26 and the winch hook 27 raised, and the double boom assembly 40 titled inward and resting on the inner stop 38. This figure depicts how the motorcycle or electric bike rack for a vehicle 5 looks carrying a motorcycle or electric bike 110.

With the base embodiment, a motorcycle or electric bike 110 is loaded onto the motorcycle or electric bike rack for a vehicle 5 as follows. The double boom assembly 40 on motorcycle or electric bike rack for a vehicle 5 can be rotated, tilted, retracted, and laid down for easier transport, as depicted in FIG. 5. The double boom assembly 40 on motorcycle or electric bike rack for a vehicle 5 can be rotated, tilted, extended, and raised up in order to load a motorcycle electric bike 110, as depicted in FIG. 6. The double boom assembly 40 is tilted outwards so that the outer stop 39 on the double boom assembly 40 contacts the fairlead 28 or the plinth 31, so that the weight of the double boom assembly 40 is resting on the fairlead 28 or the plinth 31 and rigidly held up there by. This condition is depicted in FIG. 7. Then, motorcycle or electric bike 110 is parked or placed adjacent to the motorcycle or electric bike rack for a vehicle 5, according to where the motorcycle or electric bike rack for a vehicle 5 is attached onto the vehicle 100. The double boom assembly 40 is positioned so that the winch hook 27 is facing the motorcycle or electric bike 110 or adjacent to the motorcycle or electric bike 110, as depicted in FIG. 8. Next, the winch line 26 and winch hook 27 are extended from primary boom 42 and the winch hook 27 is attached to the motorcycle or electric bike 110. This condition is depicted in FIG. 8. Then, the winch 20 is turned on and the winch line 26 and winch hook 27 are retracted into primary boom 42 until the motorcycle or electric bike 110 is fully retracted and adjacent to the upper bow 46 of primary boom 42. This condition is depicted in FIG. 9. Then the double boom assembly 40 is tilted inwards so that the lower bow 44 of the primary boom 42 contacts the inner stop 38, so that the weight of the double boom assembly 40 is resting on the inner stop 38 and rigidly held up there by. This condition is depicted in FIG. 10. With this embodiment, loading of the motorcycle or electric bike 110 is complete. The user may travel to their destination with the motorcycle or electric bike 110 loaded. To unload the motorcycle electric bike 110, the user would then reverse the steps described above in order to unload the motorcycle or electric bike 110.

As can be seen from FIG. 10, the base embodiment of motorcycle or electric bike rack for a vehicle 5 does not have a lot of structure to extensively and rigidly hold the motorcycle or electric bike 110 in place without a certain amount of vibrations or jostling. To remedy this, other embodiments of motorcycle or electric bike rack for a vehicle 5 may include a multi-sport rack or heavy bike rack 60. In these embodiments, multi-sport rack or heavy bike rack 60 is rigidly attached to the vehicle 100 in some way shape or form. The exact method of rigid attachment is not important to this invention. The important thing is that the multi-sport rack or heavy bike rack 60 is somehow rigidly attached to the vehicle 100. Applicant may be biased, however, applicant believes that the best way to rigidly attach the multi-sport rack or heavy bike rack 60 to a vehicle 100 is using the devices shown and described in U.S. Pat. Nos. 12,269,432 and 12,403,842 that were patented by the applicant. In any event, multi-sport rack or heavy bike rack 60 is rigidly attached to a bracket or bracket assembly 105, which, in turn, is rigidly attached to the vehicle 100. Bracket or bracket assembly 105 is not a part of this invention. As stated above, winch 20, multi-axis hinge or joint 30, and double boom assembly 40 are also rigidly attached to the same bracket or bracket assembly 105.

Motorcycle or electric bike rack for a vehicle 5 may further comprise: a multi-sport rack or heavy bike rack 60. Multi-sport rack or heavy bike rack 60 comprises: an inner base rail 62; an outer base rail 63; a front stanchion assembly 64; a front ratcheting tire clamp 65; a rear stanchion assembly 66; and a rear ratcheting tire clamp 67.

Inner base rail 62 is a rigid horizontal structural member. Inner base rail 62 has a length, a width, a height, an upper surface, a lower surface, an inner surface, an outer surface, a front end, a rear end, and a longitudinal axis. The length of inner base rail 62 is longer than a bicycle's axle-to-axle distance but shorter than a bicycle's outer length dimension or tire-to-tire dimension. In best mode, inner base rail 62 is a length of square or rectangular tubing or solid material.

Outer base rail 63 is a rigid horizontal structural member. Outer base rail 63 has a length, a width, a height, an upper surface, a lower surface, an inner surface, an outer surface, a front end, a rear end, and a longitudinal axis. Outer base rail 63 is a duplicated of inner base rail 62. In best mode, outer base rail 63 is a length of square or rectangular tubing or solid material.

The lower surface of inner base rail 62 is rigidly attached to the upper surface of a bracket or bracket assembly 105. The lower surface of outer base rail 63 is rigidly attached to the upper surface of a bracket or bracket assembly 105. The front end of inner base rail 62 is aligned with and even with the front end of outer base rail 63. The rear end of inner base rail 62 is aligned with and even with the rear end of outer base rail 63. The distance between the outer surface of inner base rail 62 and the inner surface of outer base rail 63 is slightly larger than the width of a bicycle tire so that a bicycle tire may freely slide into this gap. Rigid attachment may be accomplished by any known means such as: weld, solder, glue, epoxy, adhesive, bolts, screws, rivets, clips, snaps, pins, or fasteners. In best mode, attachment is accomplished with eight bike rack fasteners and eight bike rack nuts.

Front stanchion assembly 64 comprises an inner stanchion and an outer stanchion. Inner stanchion on front stanchion assembly 64 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on front stanchion assembly 64 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 62. The inner surface of the lower end of outer stanchion is pivotally attached to the outer surface of the front end of outer base rail 63. Pivotal attachment is such that inner and outer stanchions may be rotated to any position along a half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even continuous gap there between. This is accomplished by a structural member with a first end rigidly attached to the outer surface of the upper end of inner stanchion and a second end rigidly attached to the inner surface of the upper end of the outer stanchion.

Front stanchion assembly 64 rotates around the attachment points to inner and outer base rails 62,63, which are pivot points. Front stanchion assembly 64 may be rotated from a zero to 180 degrees between front stanchion assembly 64 and the inner and outer base rails 62,63. Thus, front stanchion assembly 64 may be rotated to zero degrees when not in use and not carrying a bicycle 120 and then all the back out to 180 degrees when mounting a bicycle 120 on the modular rack system 5.

Front ratcheting tire clamp 65 is a rigid horizontal structural member that is slidably attached to inner and outer stanchions on front stanchion assembly 64. The slidable attachment is such that front ratcheting tire clamp 65 remains perpendicular to inner and outer stanchions on front stanchion assembly 64 while it slides upwards and downwards along the lengths or longitudinal axes of inner and outer stanchions on front stanchion assembly 64. Further the slidable attachment is biased or ratcheted in that the front ratcheting tire clamp 65 freely slides downwards but is restricted from any upward movement without first releasing a ratchet catch.

Rear stanchion assembly 66 comprises an inner stanchion and an outer stanchion. Inner stanchion on rear stanchion assembly 66 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on rear stanchion assembly 66 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 62. The inner surface of the lower end of outer stanchion is pivotally attached to the outer surface of the front end of outer base rail 63. Pivotal attachment is such that inner and outer stanchions may be rotated to any position along the half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even gap there between. This is accomplished by a structural member with a first end rigidly attached to the outer surface of the upper end of inner stanchion and a second end rigidly attached to the inner surface of the upper end of the outer stanchion.

Rear stanchion assembly 66 rotates around the attachment points to inner and outer base rails 62,63, which are pivot points. Rear stanchion assembly 66 may be rotated from a zero to 180 degrees between rear stanchion assembly 66 and the inner and outer base rails 62,63. Thus, rear stanchion assembly 66 may be rotated to zero degrees when not in use and not carrying a bicycle 120 and then all the back out to 180 degrees when mounting a bicycle 120 on the modular rack system 5.

Rear ratcheting tire clamp 67 is a rigid horizontal structural member that is slidably attached to inner and outer stanchions on rear stanchion assembly 66. The slidable attachment is such that rear ratcheting tire clamp 67 remains perpendicular to inner and outer stanchions on rear stanchion assembly 66 while it slides upwards and downwards along the lengths or longitudinal axes of inner and outer stanchions on rear stanchion assembly 66. Further the slidable attachment is biased or ratcheted in that the rear ratcheting tire clamp 67 freely slides downwards but is restricted from any upward movement without first releasing a ratchet catch.

Figure 11:
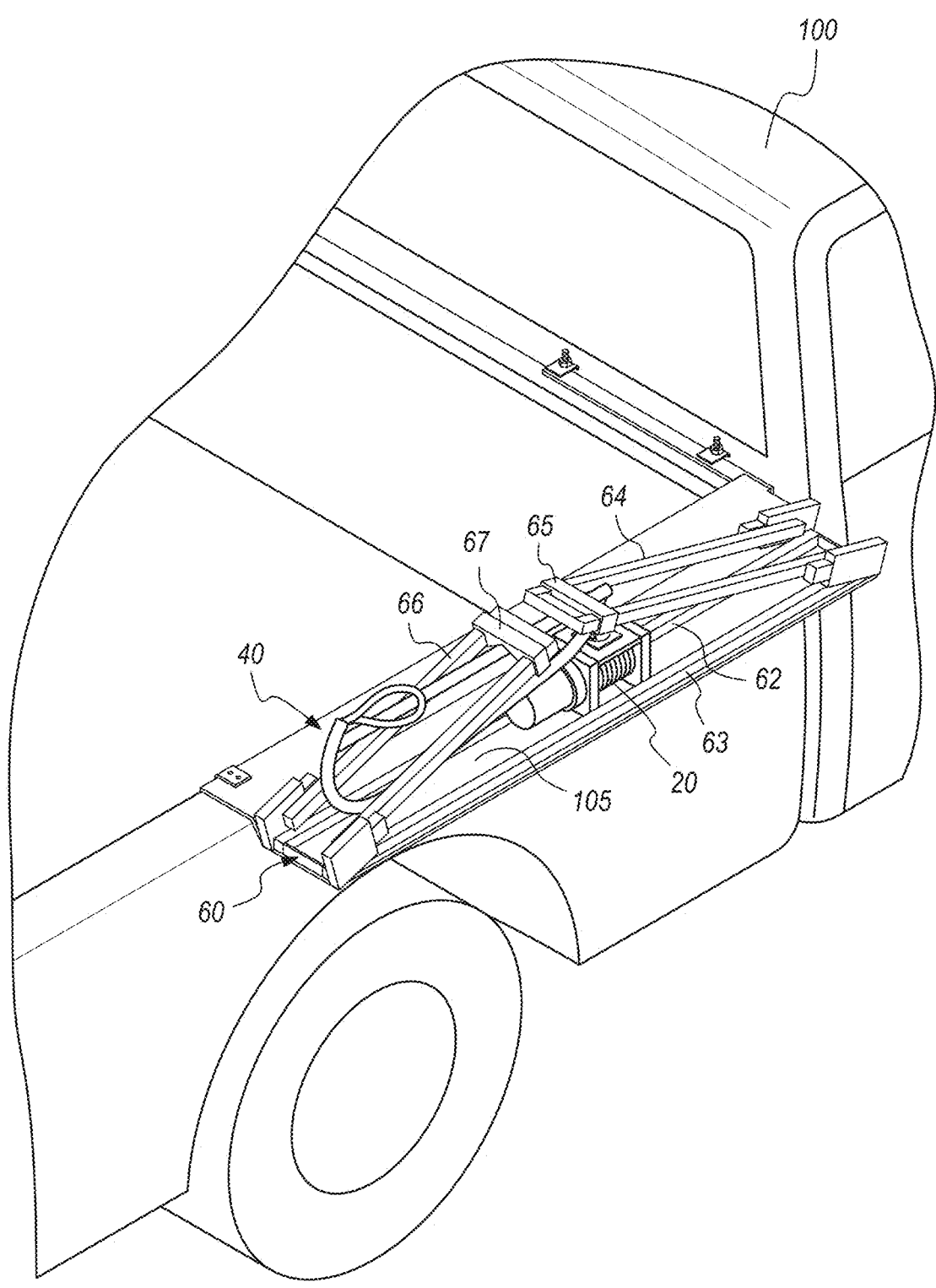
FIG. 11 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 and the double boom assembly 40 are collapsed and in the stow position, without a motorcycle or electric bike 110. This figure depicts how the motorcycle or electric bike rack for a vehicle 5 looks when attached to a vehicle 100 and traveling on the roadways without a motorcycle or electric bike 110.
Figure 12:
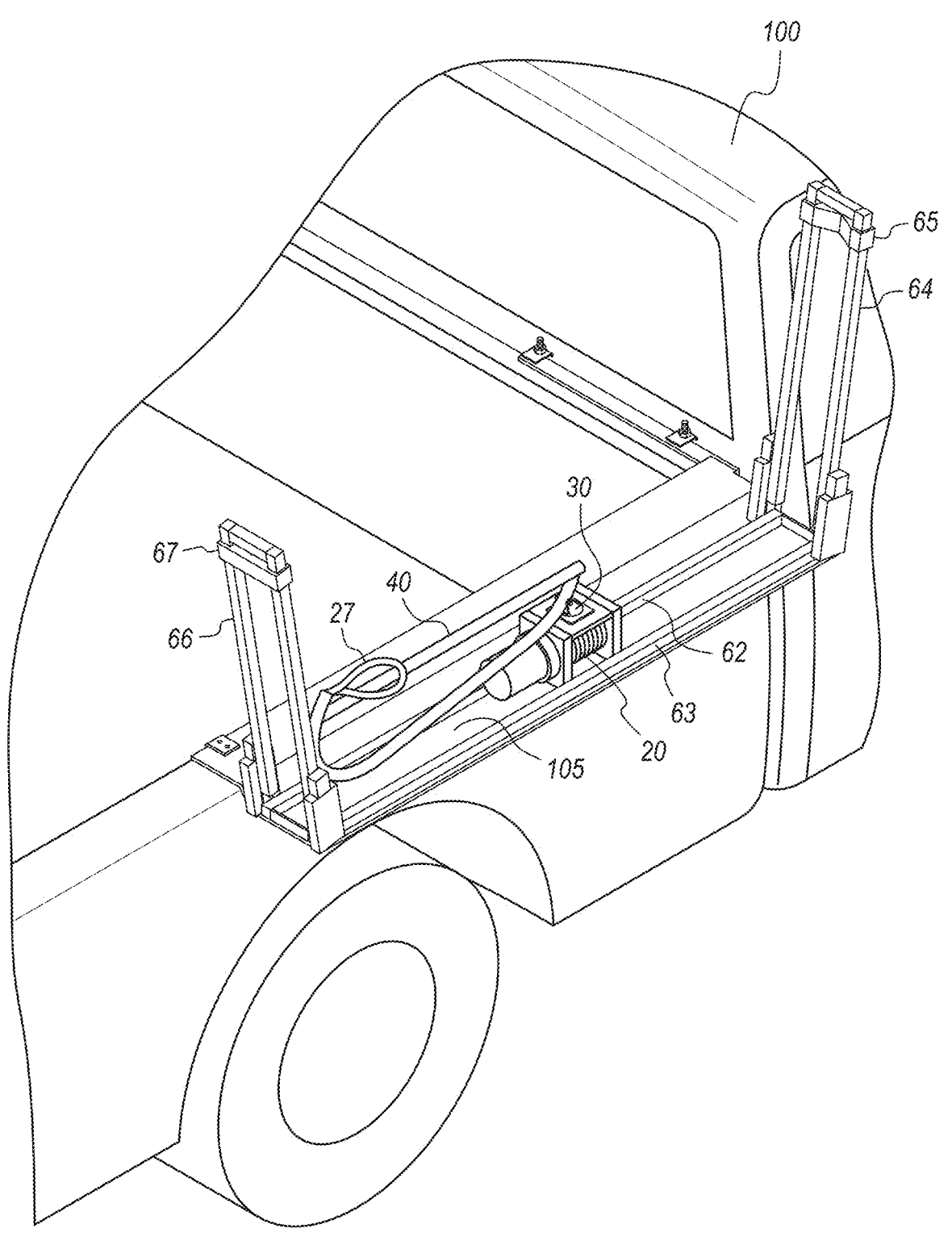
FIG. 12 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the open position and the double boom assembly 40 is collapsed and in the stow position, without a motorcycle or electric bike 110.
Figure 13:
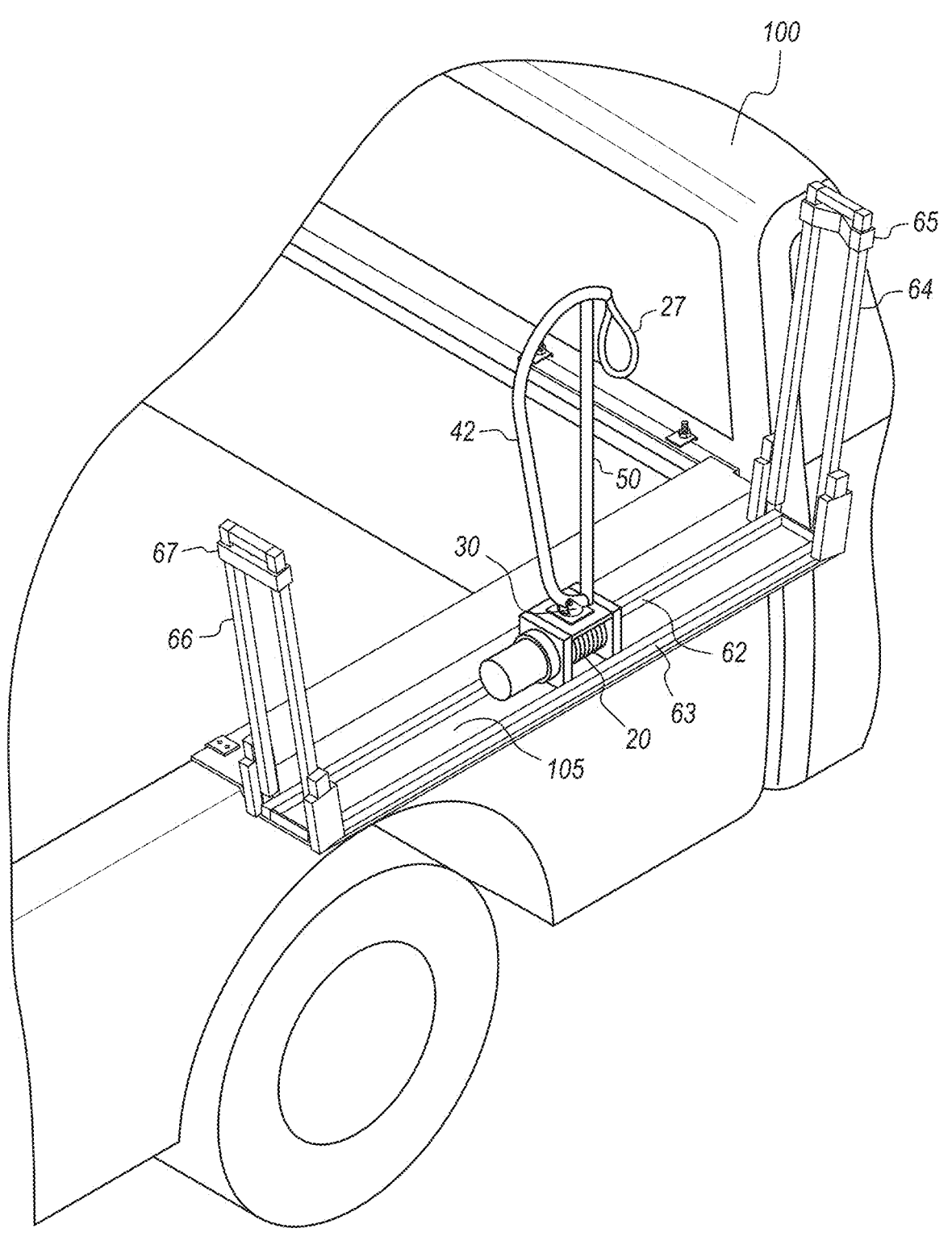
FIG. 13 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the open position and the double boom assembly 40 is in the erect position, with the winch hook 27 facing forward, without a motorcycle or electric bike 110.
Figure 14:
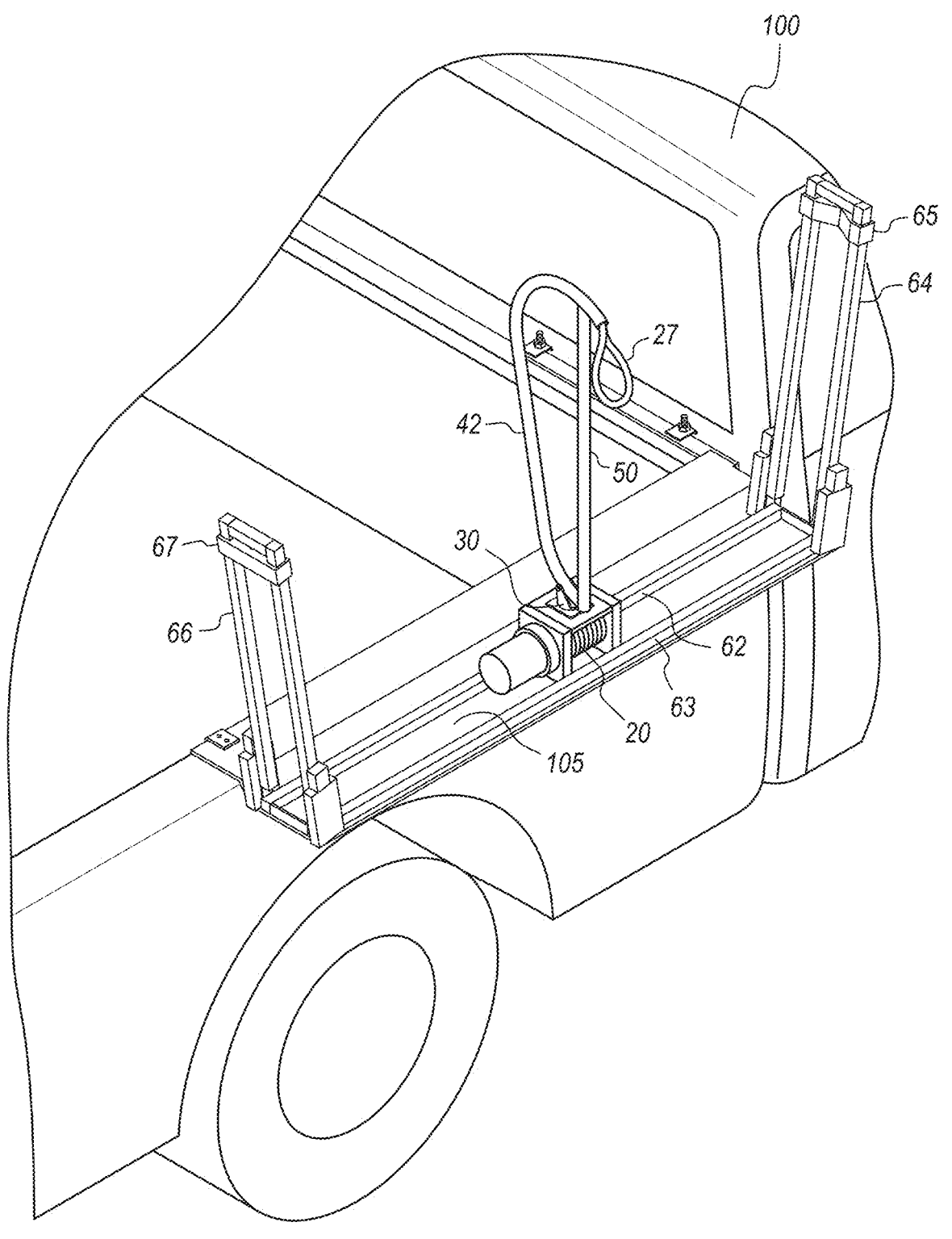
FIG. 14 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the open position and the double boom assembly 40 is in the erect position, resting on the outer stop 39, with the winch hook 27 facing outward, without a motorcycle or electric bike 110.
Figure 15:
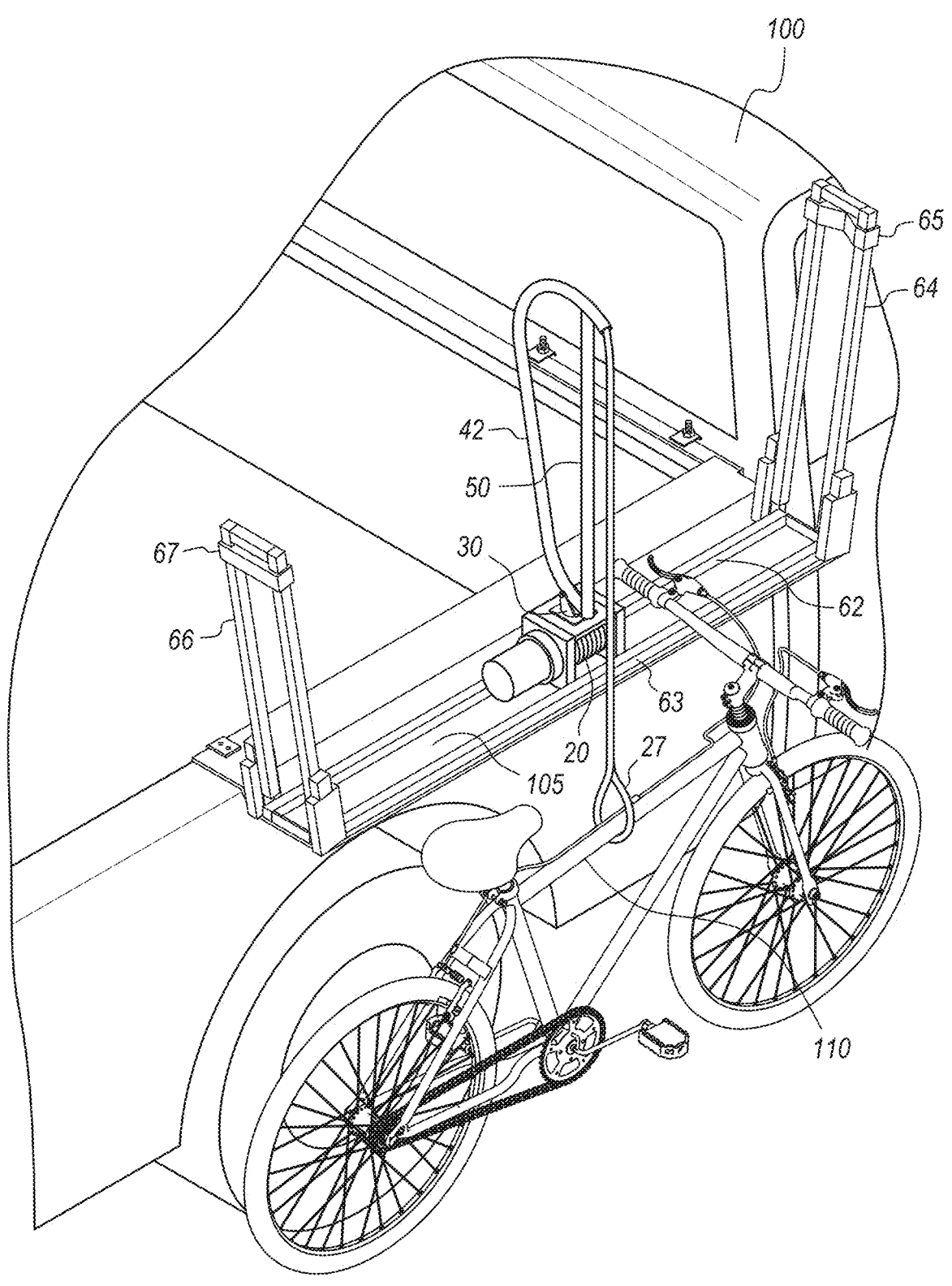
FIG. 15 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the open position and the double boom assembly 40 is in the erect position, resting on the outer stop 39, the winch hook 27 facing outward, the winch line 26 and the winch hook 27 lowered, and the winch hook 27 attached to a motorcycle or electric bike 110.
Figure 16:
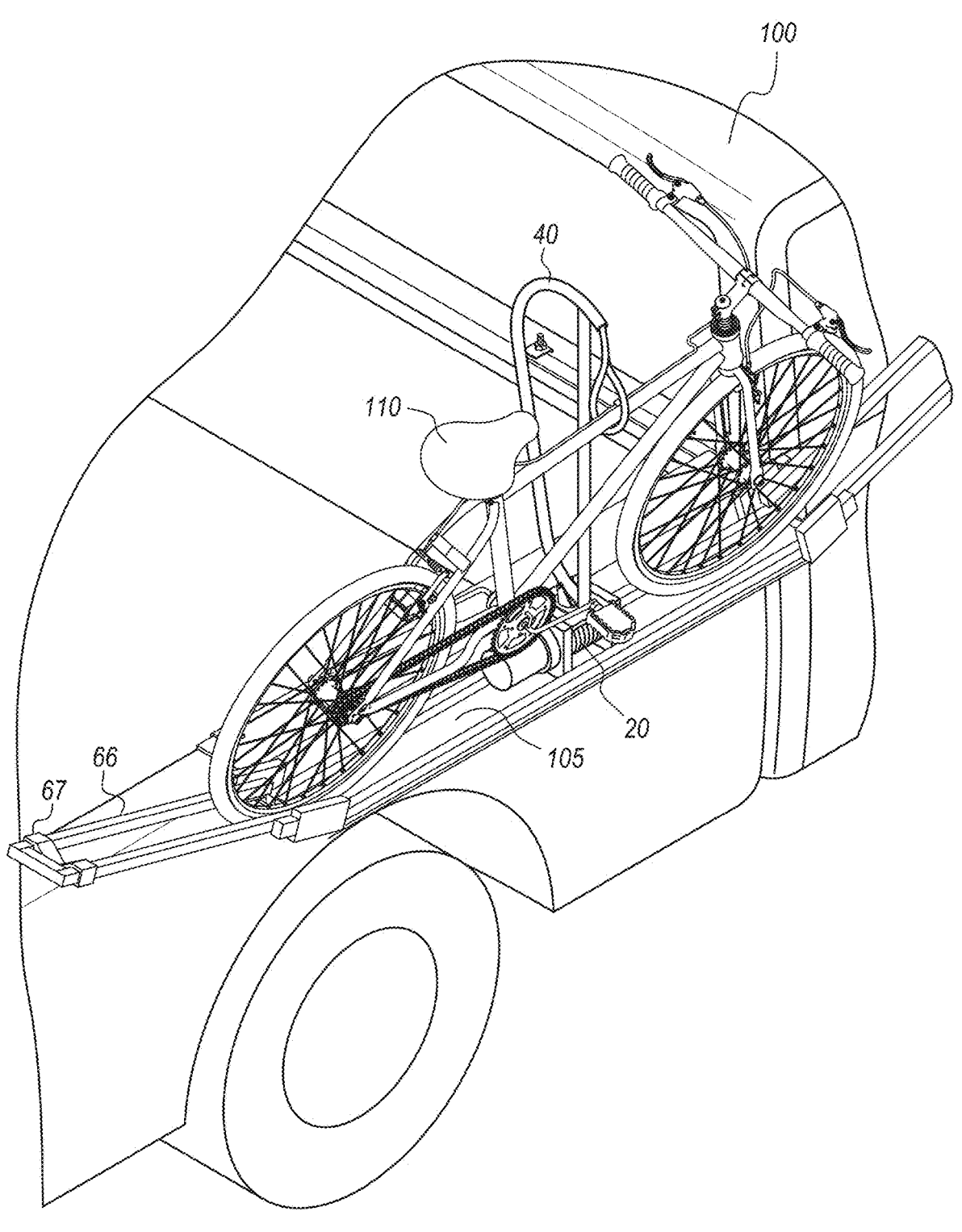
FIG. 16 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the open position and the double boom assembly 40 is in the erect position, resting on the inner stop 38, the winch hook 27 facing outward, the winch line 26 and the winch hook 27 raised, and the winch hook 27 attached to a motorcycle or electric bike 110.
Figure 17:
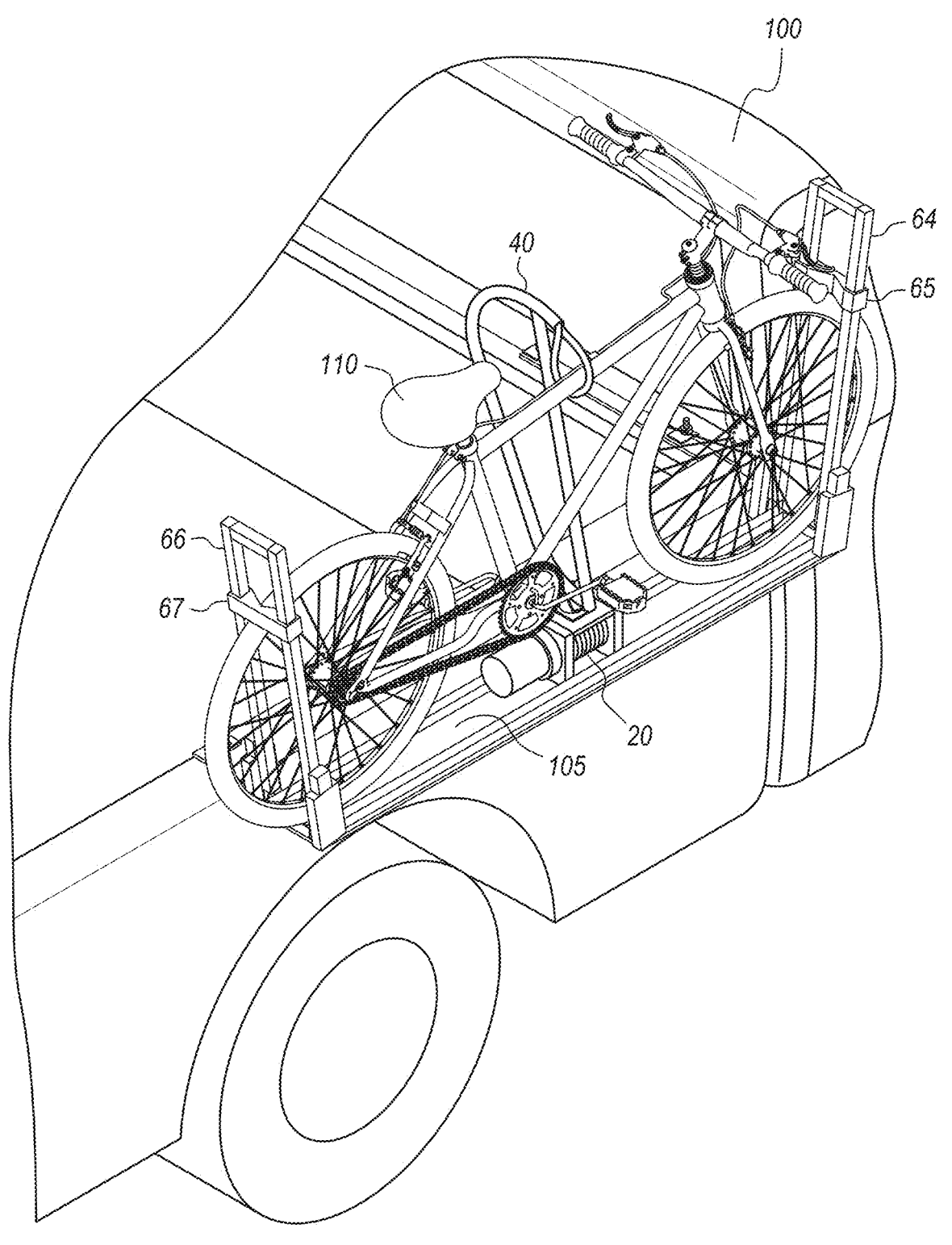
FIG. 17 is a perspective view of motorcycle or electric bike rack for a vehicle 5 with a multi-sport rack or bike rack 60, attached to a bracket or bracket assembly 105, which is attached to a vehicle 100, wherein the multi-sport rack or heavy bike rack 60 is in the closed position and the double boom assembly 40 is in the erect position, resting on the inner stop 38, the winch hook 27 facing outward, the winch line 26 and the winch hook 27 raised, and the winch hook 27 attached to a motorcycle or electric bike 110. This FIG. depicts how the motorcycle or electric bike rack for a vehicle 5 looks carrying a motorcycle or electric bike 110.
Figure 18:
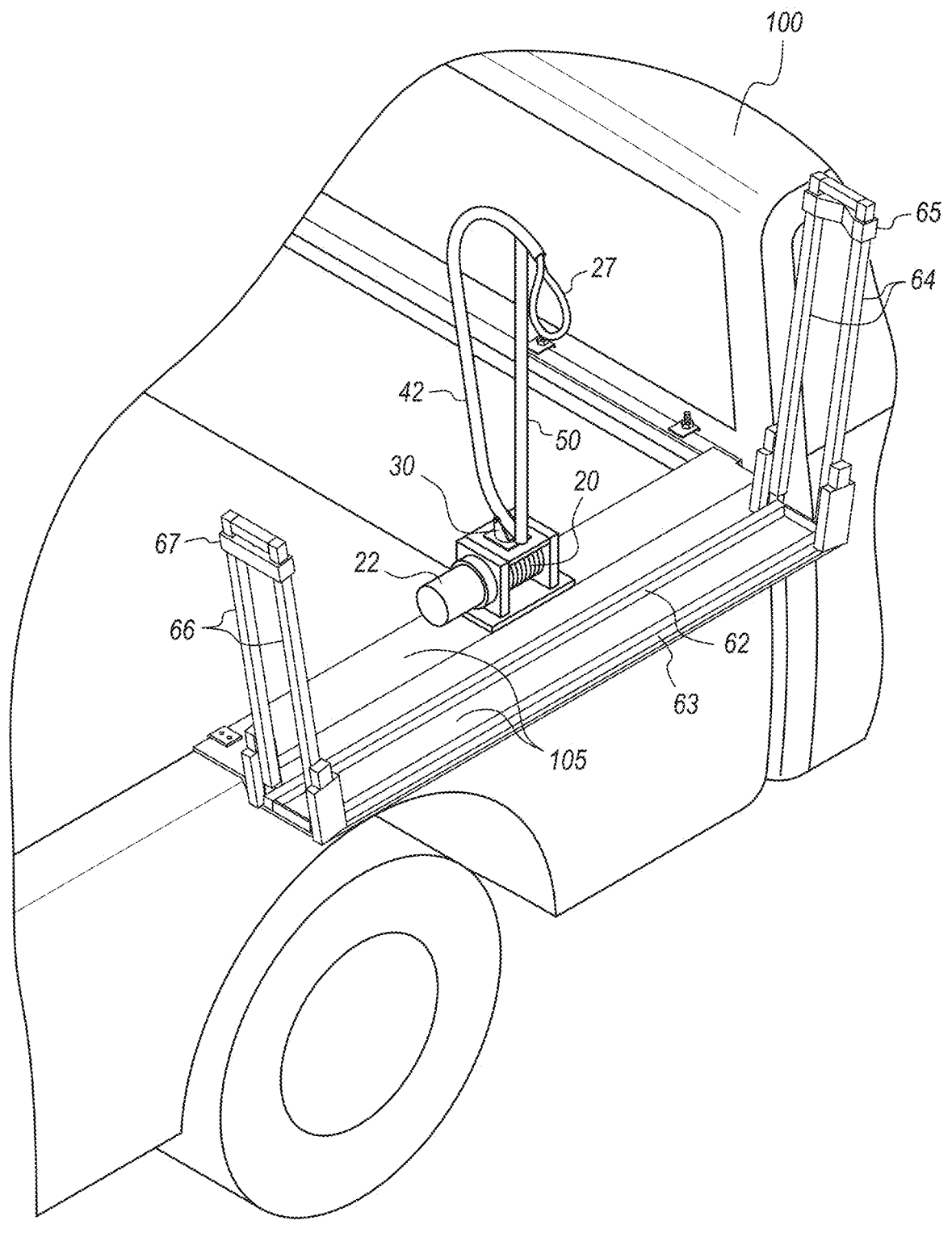
FIG. 18 is a perspective view of an embodiment of vehicle rack for motorcycle oil electric bike 5 with a multi-sport rack or bike rack 60 wherein the winch 20, multi axis hinge or joint 30, and double boom assembly 40 are mounted on a different plane and location as the multi-sport rack or bike rack 60.

With these embodiments, a motorcycle or electric bike 110 is loaded onto the motorcycle or electric bike rack for a vehicle 5 as follows. The double boom assembly 40 and the multi-sport rack or heavy bike rack 60 on motorcycle or electric bike rack for a vehicle 5 can be rotated, tilted, retracted, and laid down for easier transport, as depicted in FIG. 11. The multi-sport rack or heavy bike rack 60 on motorcycle or electric bike rack for a vehicle 5 can be tilted, extended, and raised up in order to load a motorcycle electric bike 110. This condition is depicted in FIG. 12. The double boom assembly 40 on motorcycle or electric bike rack for a vehicle 5 can be rotated, tilted, extended, and raised up in order to load a motorcycle electric bike 110. This condition is depicted in FIG. 13. The double boom assembly 40 is tilted outwards so that the outer stop 39 on the double boom assembly 40 contacts the fairlead 28 or the plinth 31, so that the weight of the double boom assembly 40 is resting on the fairlead 28 or the plinth 31 and rigidly held up there by. This condition is depicted in FIG. 14. Then, motorcycle or electric bike 110 is parked or placed adjacent to the motorcycle or electric bike rack for a vehicle 5, according to where the motorcycle or electric bike rack for a vehicle 5 is attached onto the vehicle 100. The double boom assembly 40 is positioned so that the winch hook 27 is facing the motorcycle or electric bike 110 or adjacent to the motorcycle or electric bike 110, as depicted in FIG. 15. Next, the winch line 26 and winch hook 27 are extended from primary boom 42 and the winch hook 27 is attached to the motorcycle or electric bike 110. This condition is depicted in FIG. 15. Then, the winch 20 is turned on and the winch line 26 and winch hook 27 are retracted into primary boom 42 until the motorcycle or electric bike 110 is fully retracted and adjacent to the upper bow 46 of primary boom 42. This condition is depicted in FIG. 16. Then the double boom assembly 40 is tilted inwards so that the lower bow 44 of the primary boom 42 contacts the inner stop 38, so that the weight of the double boom assembly 40 is resting on the inner stop 38 and rigidly held up there by. This condition is depicted in FIG. 17. With this embodiment, loading of the motorcycle or electric bike 110 is complete. The user may travel to their destination with the motorcycle or electric bike 110 loaded. To unload the motorcycle electric bike 110, the user would then reverse the steps described above in order to unload the motorcycle or electric bike 110.

What is claimed:

1. A motorcycle or electric bike rack for a vehicle comprising: a winch; a multi-axis hinge or joint; and a double boom assembly, wherein, said winch comprises: a motor; a drum; a winch line; a winch hook; and a fairlead, wherein, said motor is a machine that supplies motive power to rotate a driveshaft, said driveshaft has: a first end, a second end, a length, an outside diameter, and a longitudinal axis, said motor has a locking mechanism which locks said motor when said motor is not in use, said drum is a rigid cylindrical container, spool, or reel, said drum has: an upper side, a lower side, inner side, outer side, a length, an outside diameter, and a longitudinal axis, said drum is pivotally attached to a first flange and a second flange, said drum is rigidly attached to said second end of said driveshaft, said first end of said driveshaft is rigidly attached to said motor, said winch line is a length of cordage, said winch line has: a length, a first end, a second end, and outer diameter, said first end of said winch line is attached to said drum, second end of said winch line is attached to said winch hook, said winch line is coiled around said drum and stored on said drum, said winch hook is a connector that is reversibly attachable to a motorcycle or electric bike, said fairlead is a plate that helps neatly coil said winch line around said drum and neatly unwind said winch line from said drum without said winch line getting tangled, said fairlead is mounted on said upper side of said drum, and said lower side of said drum is rigidly attached to a bracket or bracket assembly, said multi-axis hinge or joint comprises: a plinth; a platter; a first wing;

a second wing; an axle; two axle nuts; an inner stop; and an outer stop, wherein, said plinth is a rigid rectangular or square shaped horizontal planar member with: an upper surface, lower surface, inner edge, outer edge, a first edge, a second edge, a length, a width, a thickness, and a plane, said lower surface of said plinth is rigidly attached to said upper surface of said fairlead so that said plane of said plinth is horizontal and parallel with said plane of said fairlead, said platter is a rigid circular shaped horizontal planar member with: an upper surface, lower surface, inner edge, outer edge, a first edge, a second edge, a center, a circumference, an outer diameter, a thickness, and a plane, said lower surface of said platter is pivotally attached to said upper surface of said plinth so that said plane of said platter is horizontal and parallel with said plane of said plinth, said first wing is a rigid wing-shaped vertical planar member with: a first surface, a second surface, an upper edge, a lower edge, an inner edge, an outer edge, a thickness, and a plane, said lower edge of said first wing is rigidly attached to said upper surface of said platter adjacent to said circumference of said platter, said outer edge of said first wing points upwards at a diagonal that is at an angle of 35-55 degrees from horizontal, said outer edge of said first wing has an axle mounting hole, said second wing is a rigid wing-shaped vertical planar member with: a first surface, a second surface, an upper edge, a lower edge, an inner edge, an outer edge, a thickness, and a plane, said lower edge of said second wing is rigidly attached to said upper surface of said platter adjacent to said circumference of said platter, said outer edge of said second wing points upwards at a diagonal that is at an angle of 35-55 degrees from horizontal, said outer edge of said second wing has an axle mounting hole, said axle is a rigid horizontal cylindrical member with: a first end, a second end, an outer diameter, a length, and a longitudinal axis, said axle is installed into said axle mounting hole on said first wing and said axle mounting hole on said second wing, and each of said two axle nuts is a fastener that is rigidly attached to said axle, said double boom assembly comprises: a primary boom and a secondary boom, said primary boom is a rigid arced member or curved member that is a C-shape, said primary boom has: a lower bow, a middle section, and an upper bow, said lower bow is a rigid arced segment or curved segment with a lower end and an upper end, said lower end of said lower bow has a longitudinal axis that points downwards, said upper end of said lower bow has a longitudinal axis that points upwards, said longitudinal axis of said lower end of said lower bow forms a 95-175 degree angle with said longitudinal axis of said upper end of said lower bow, said middle section is a rigid linear segment or straight segment, said middle section has a lower end and an upper end, said lower end of said middle section has a longitudinal axis that points downwards, said upper end of said middle section has a longitudinal axis that points upwards, said lower end of said middle section is rigidly attached to said upper end of said lower bow, said upper bow is a rigid arced segment or curved segment, said upper bow has an inner end and an outer end, said inner end of said upper bow has a longitudinal axis that points downwards, said outer end of said upper bow has a longitudinal axis that points downwards, said longitudinal axis of said inner end of said upper bow forms a 95-175 degree angle with said longitudinal axis of said outer end of said upper bow, said inner end of said upper bow is rigidly attached to said upper end of said middle section, said secondary boom is a rigid linear member or straight member, said secondary boom has a lower end, a middle section, and an upper end, said lower end of said secondary boom has a longitudinal axis that points downwards, said upper end of secondary boom has a longitudinal axis that points upwards, said lower end of said lower bow of said primary boom is rigidly attached to said lower end of said secondary boom or to said middle section of said secondary boom, adjacent to said lower end of said secondary boom, and said upper end of said secondary boom is rigidly attached to a point on said upper bow of said primary boom that is adjacent to said outer end of said upper bow of said primary boom, said inner stop is a rigid vertical support member projecting upwards from said upper surface of said plinth adjacent to said first edge of said plinth or said upper surface of said fairlead adjacent to said first edge of said fairlead, and said outer stop is a rigid foot member rigidly attached to said lower end of said secondary boom.

2. A motorcycle or electric bike rack for a vehicle as recited in claim 1, further comprising: an inner base rail; an outer base rail; a front stanchion assembly; a front ratcheting tire clamp; a rear stanchion assembly; and a rear ratcheting tire clamp, wherein, said inner base rail is a rigid horizontal structural member, said inner base rail has a length, a width, a height, an upper surface, a lower surface, an inner surface, an outer surface, a front end, a rear end, and a longitudinal axis, said outer base rail is a rigid horizontal structural member, said outer base rail has a length, a width, a height, an upper surface, a lower surface, an inner surface, an outer surface, a front end, a rear end, and a longitudinal axis, said lower surface of said inner base rail is rigidly attached to said bracket or bracket assembly, said lower surface of said outer base rail is rigidly attached to said bracket or bracket assembly, said front end of said inner base rail is aligned with and even with said front end of said outer base rail, said rear end of said inner base rail is aligned with and even with said rear end of said outer base rail, said front stanchion assembly comprises: an inner stanchion and an outer stanchion, wherein, said inner stanchion on said front stanchion assembly is a rigid upright structural member with a length, a width, a height, an upper end, a lower end, an inner surface, an outer surface, a front surface, a rear surface, and a longitudinal axis, said outer stanchion on said front stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said front stanchion assembly is pivotally attached to said inner surface of said front end of said inner base rail, said inner surface of said lower end of said outer stanchion on said front stanchion assembly is pivotally attached to said outer surface of said front end of said outer base rail, and said outer surface of said upper end of said inner stanchion on said front stanchion assembly is rigidly attached to said inner surface of said upper end of said outer stanchion on said front stanchion assembly so that said upper end of said inner stanchion on said front stanchion assembly is even with and aligned with said upper end of said outer stanchion on said front stanchion assembly and said longitudinal axis of said inner stanchion and said longitudinal axis of said outer stanchion on said front stanchion assembly are parallel, wherein a structural member has a first end rigidly attached to said outer surface of said upper end of said inner stanchion on said front stanchion assembly and a second end rigidly attached to said inner surface of said upper end of said outer stanchion on said front stanchion assembly, said front ratcheting tire clamp is a rigid horizontal structural member that is slidably attached to said inner and said outer stanchions on said front stanchion assembly, wherein, said slidable attachment is such that said front ratcheting tire clamp remains perpendicular to said inner and said outer stanchions on said front stanchion assembly, and said slidable attachment is biased or ratcheted in that said front ratcheting tire clamp freely slides downwards but is restricted from upward movement without first releasing a ratchet catch, said rear stanchion assembly comprises: an inner stanchion and an outer stanchion, wherein, said inner stanchion on said rear stanchion assembly is a rigid upright structural member with a length, a width, a height, an upper end, a lower end, an inner surface, an outer surface, a front surface, a rear surface, and a longitudinal axis, said outer stanchion on said rear stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said rear stanchion assembly is pivotally attached to said inner surface of said front end of said inner base rail, said inner surface of said lower end of said outer stanchion on said rear stanchion assembly is pivotally attached to said outer surface of said front end of said outer base rail, and said outer surface of said upper end of said inner stanchion on said rear stanchion assembly is rigidly attached to said inner surface of said upper end of said outer stanchion on said rear stanchion assembly so that said upper end of said inner stanchion on said rear stanchion assembly is even with and aligned with said upper end of said outer stanchion on said rear stanchion assembly and said longitudinal axis of said inner stanchion and said longitudinal axis of said outer stanchion on said rear stanchion assembly are parallel, wherein a structural member has a first end rigidly attached to said outer surface of said upper end of said inner stanchion on said rear stanchion assembly and a second end rigidly attached to said inner surface of said upper end of said outer stanchion on said rear stanchion assembly, said rear ratcheting tire clamp is a rigid horizontal structural member that is slidably attached to said inner and said outer stanchions on said rear stanchion assembly, wherein, said slidable attachment is such that said rear ratcheting tire clamp remains perpendicular to said inner and said outer stanchions on said rear stanchion assembly, and said slidable attachment is biased or ratcheted in that said rear ratcheting tire clamp freely slides downwards but is restricted from upward movement without first releasing a ratchet catch.

* * * * *